Feb. 23, 1932. E. R. PERSON 1,846,141
BRUSH BRISTLING MACHINE
Filed Dec. 21, 1928 16 Sheets-Sheet 13
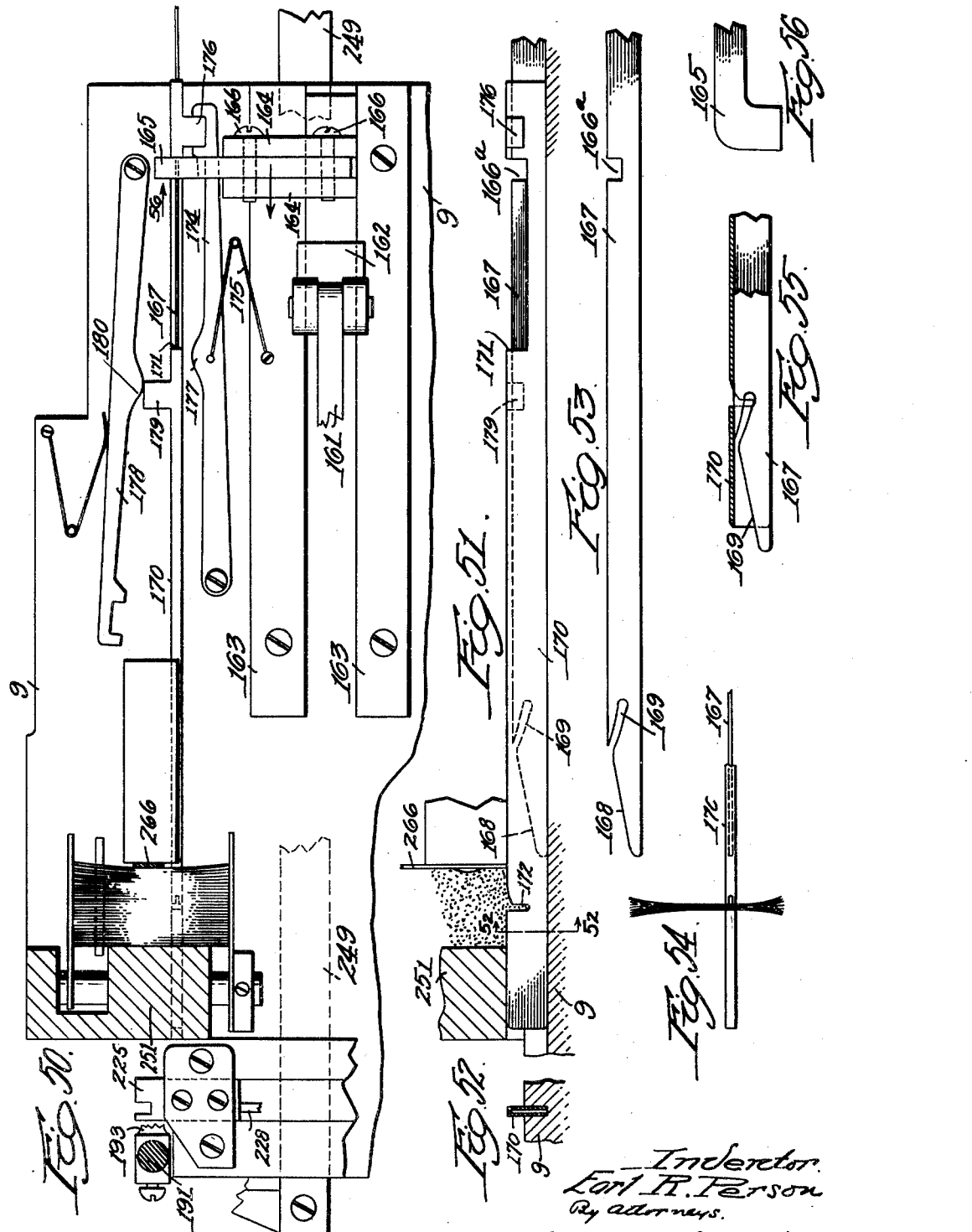

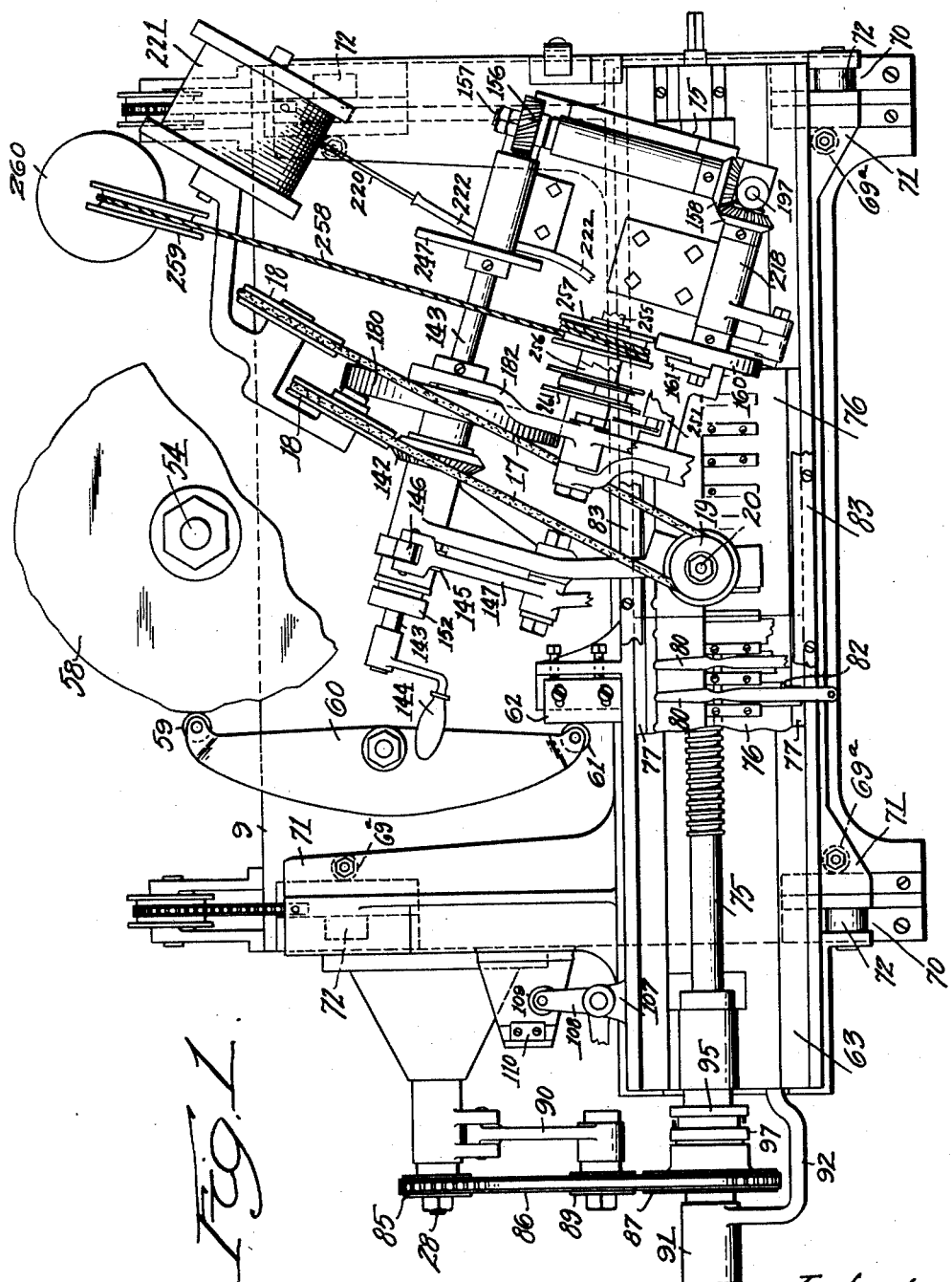

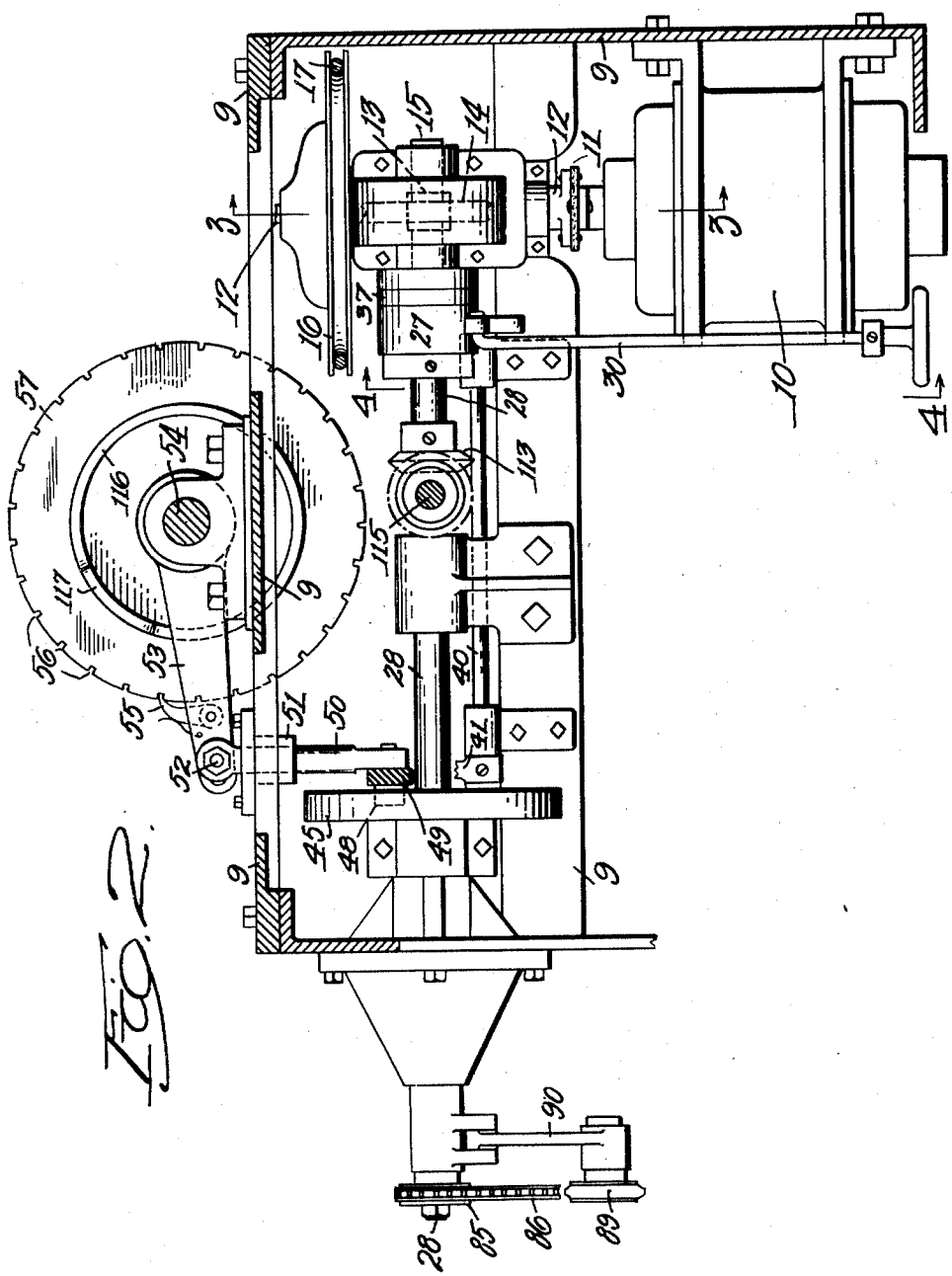

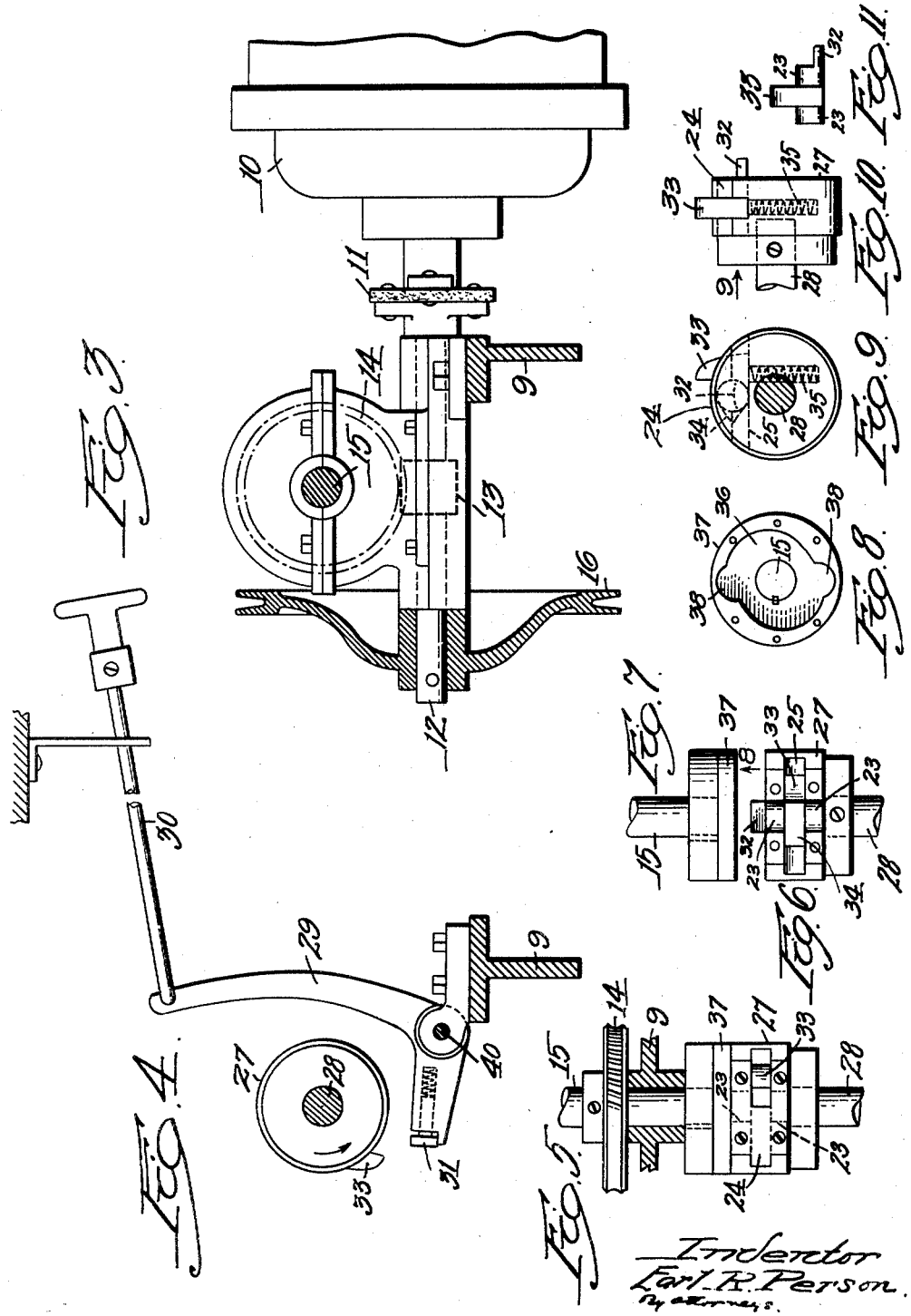

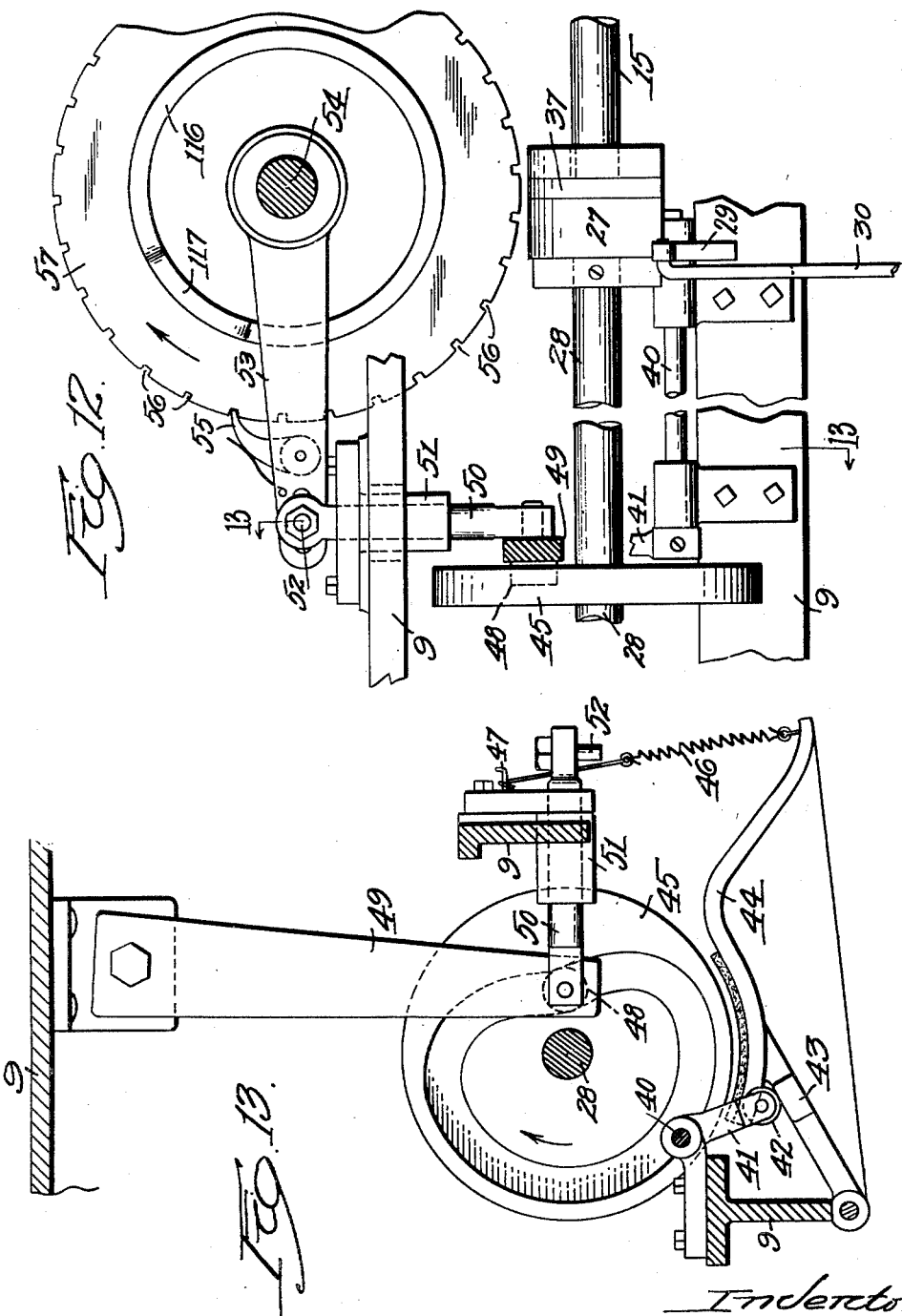

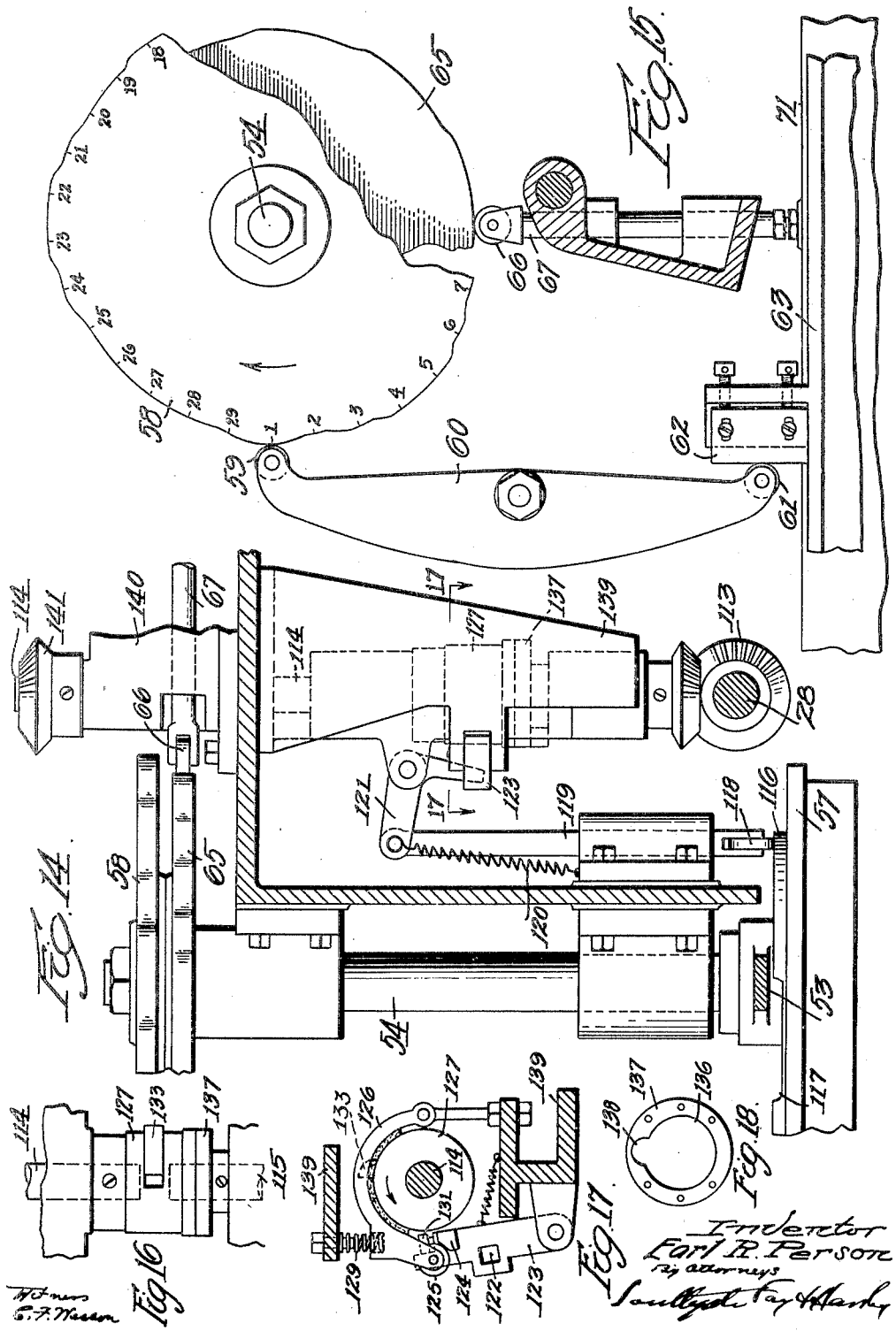

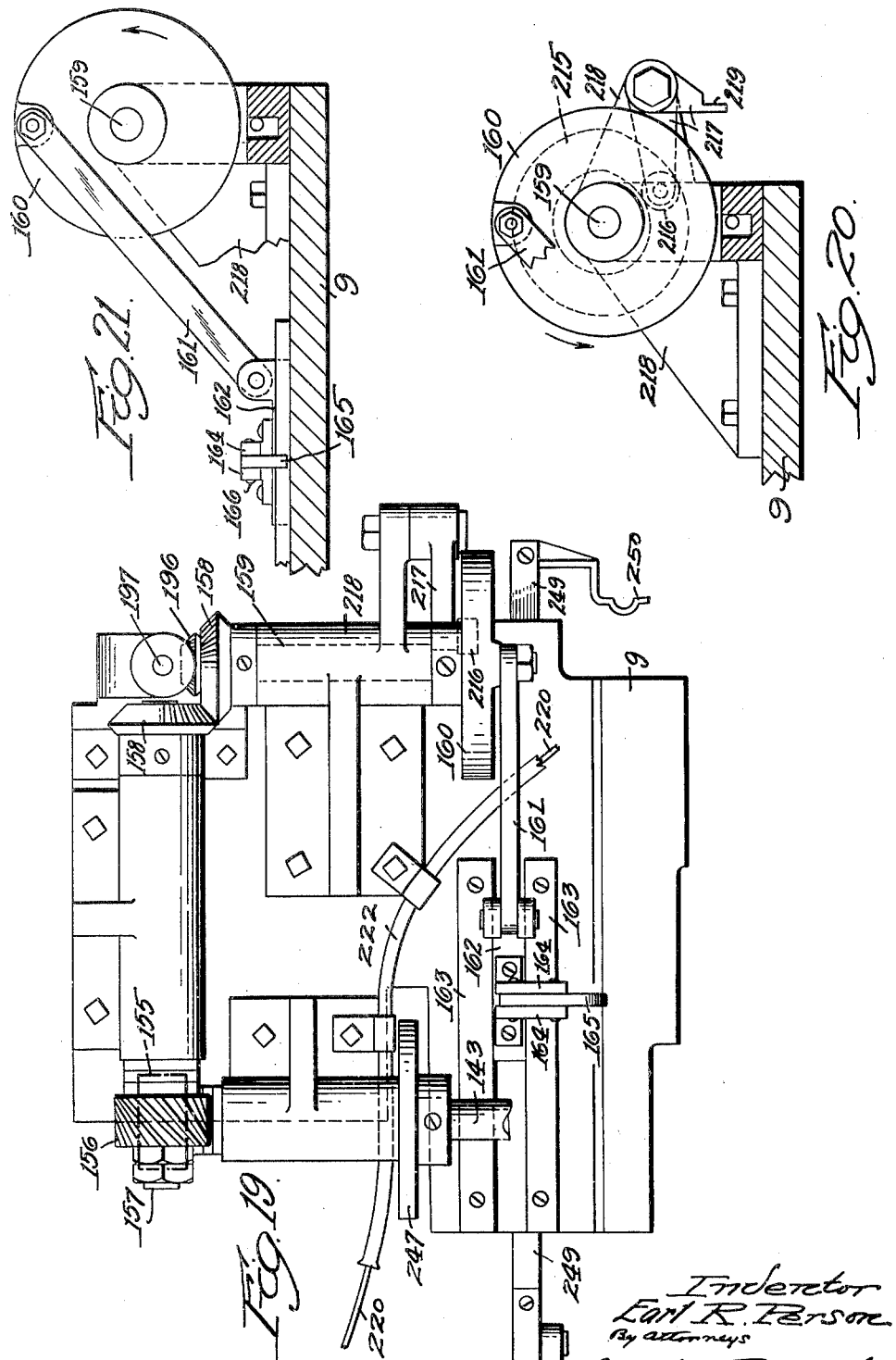

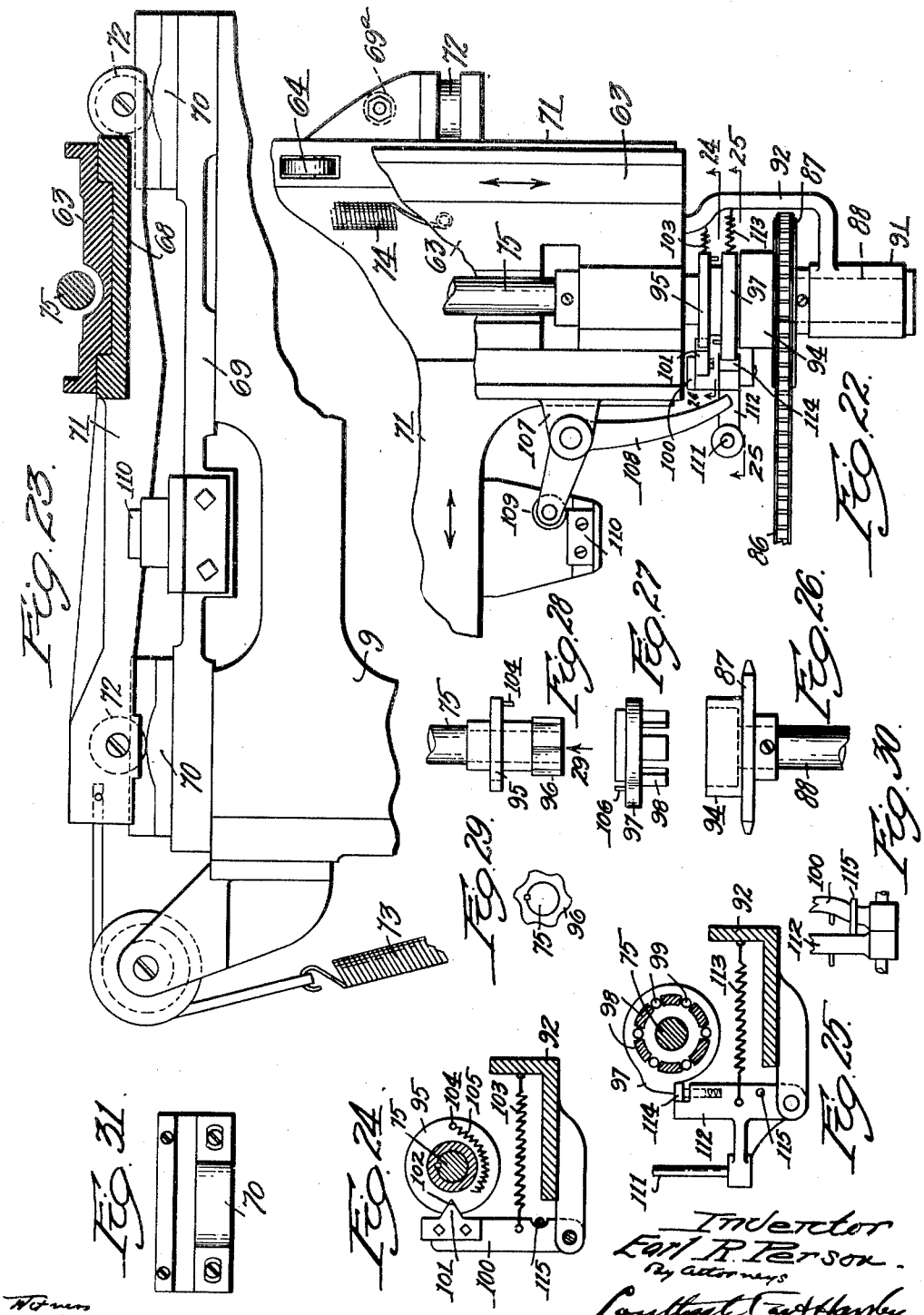

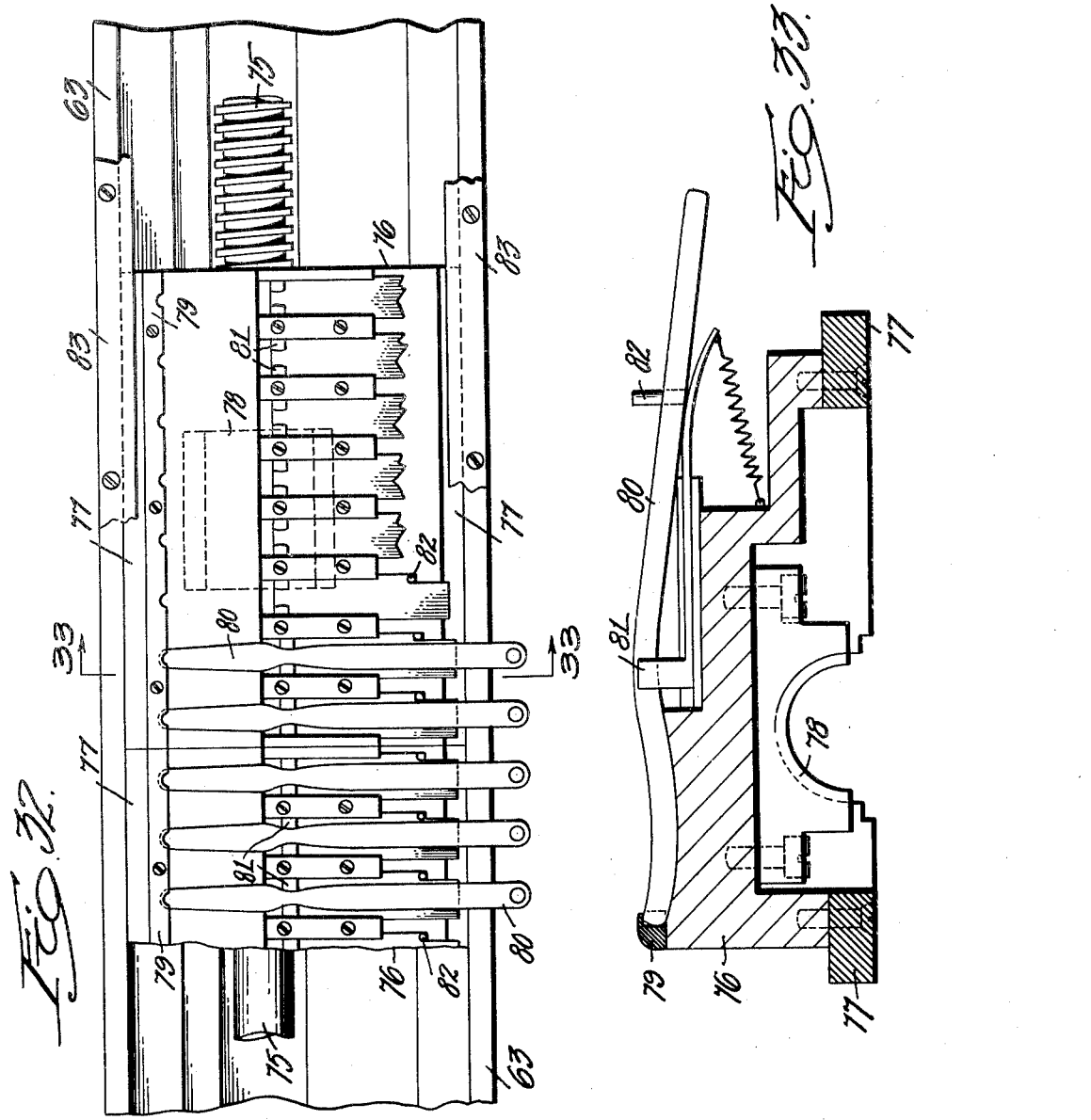

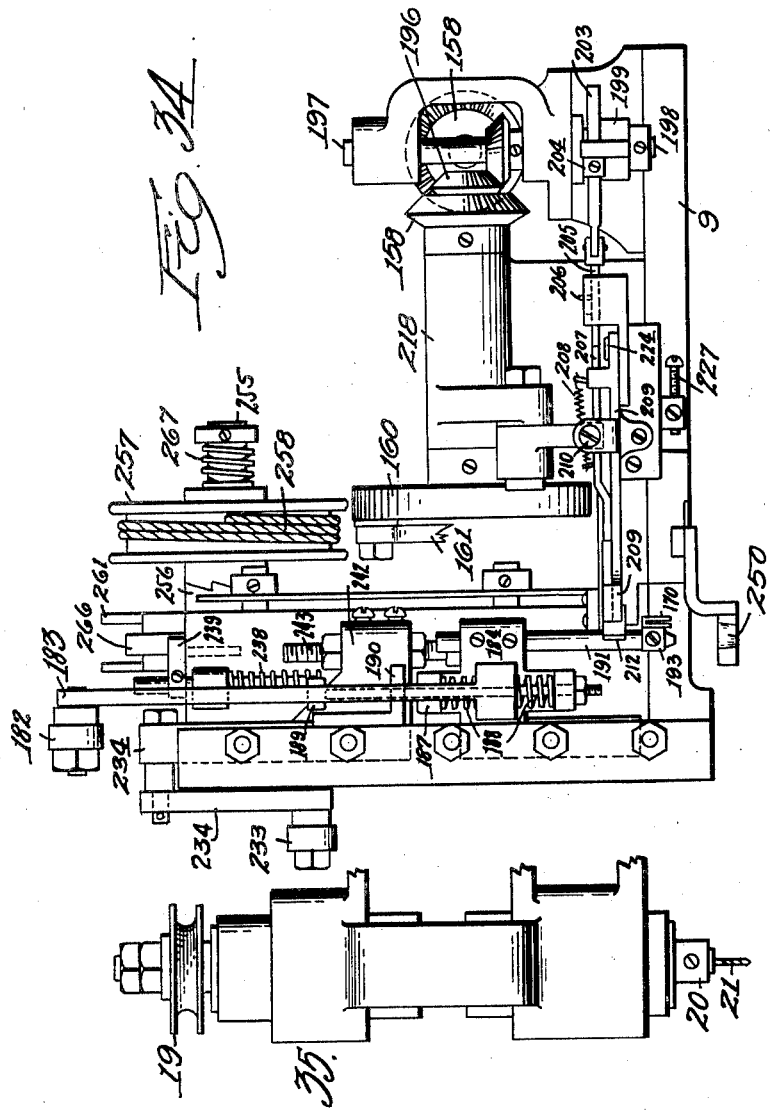

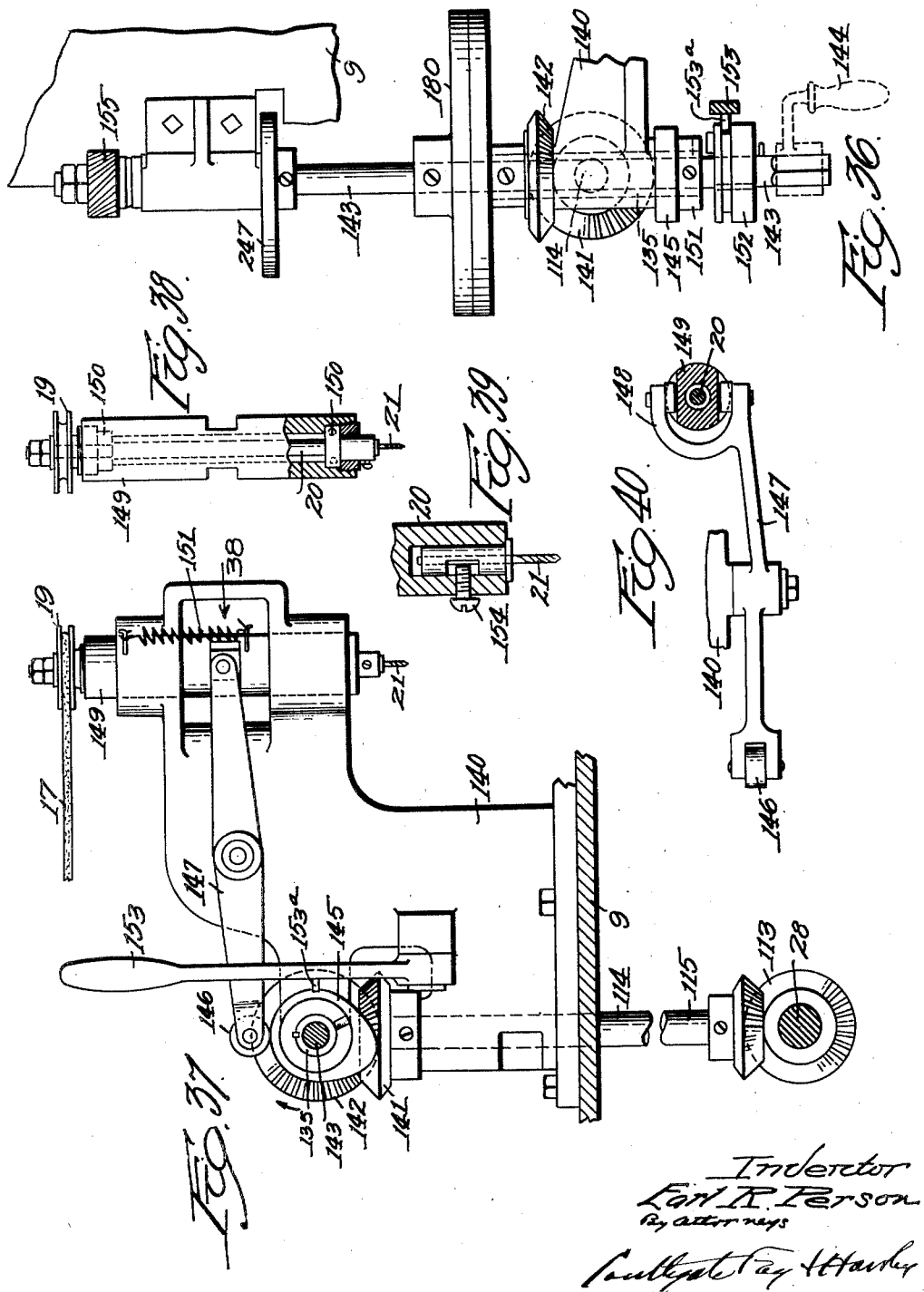

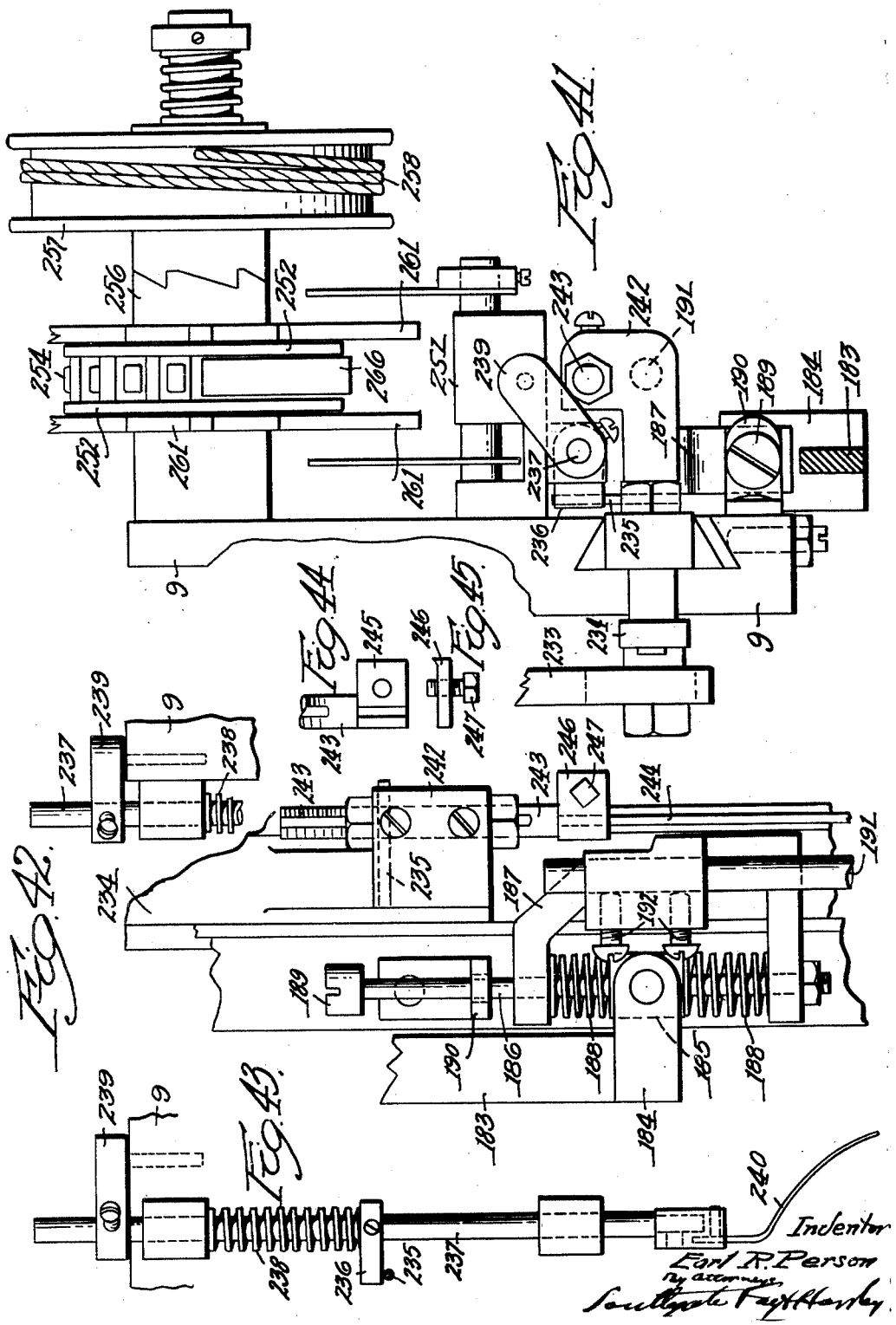

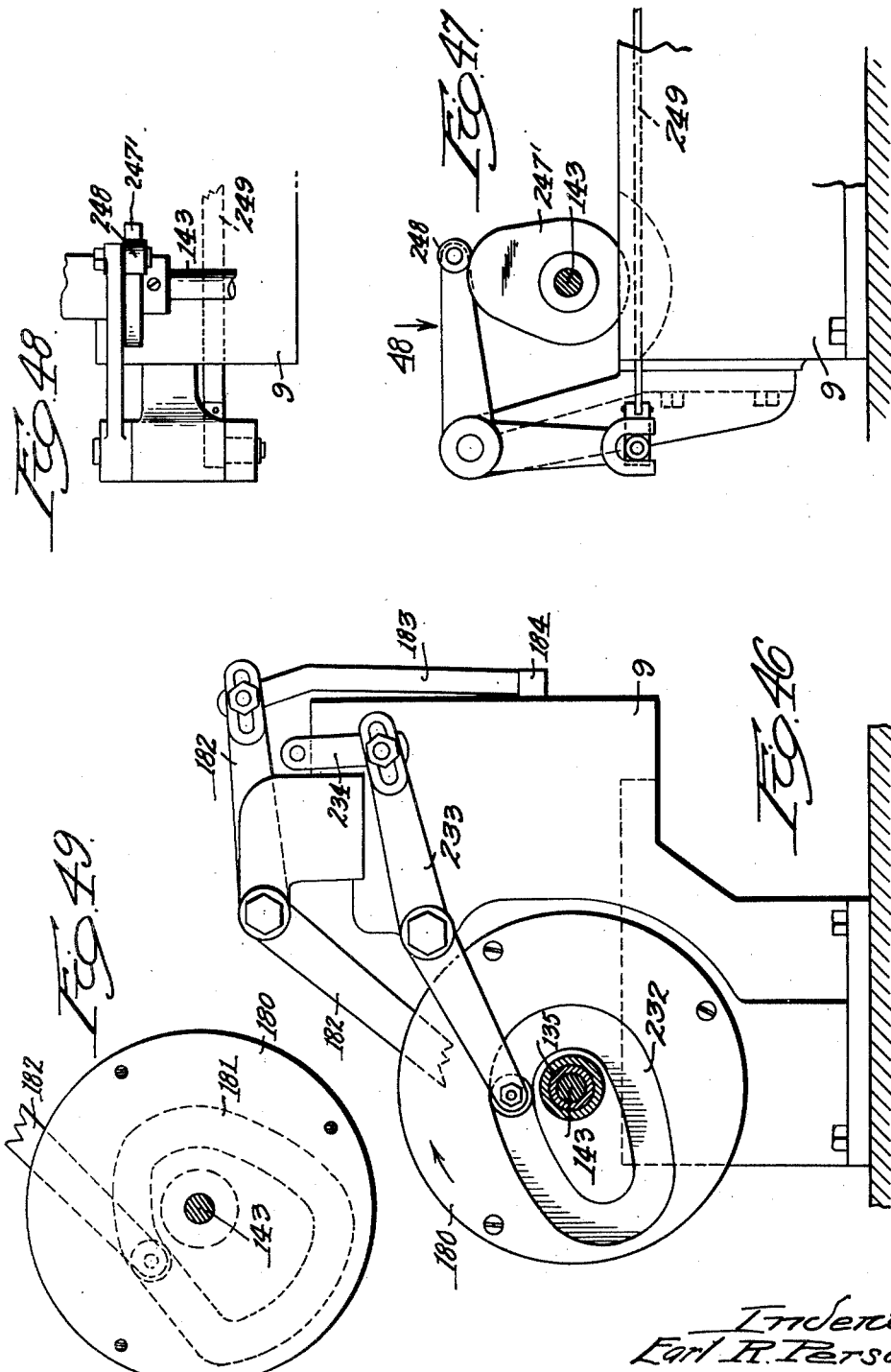

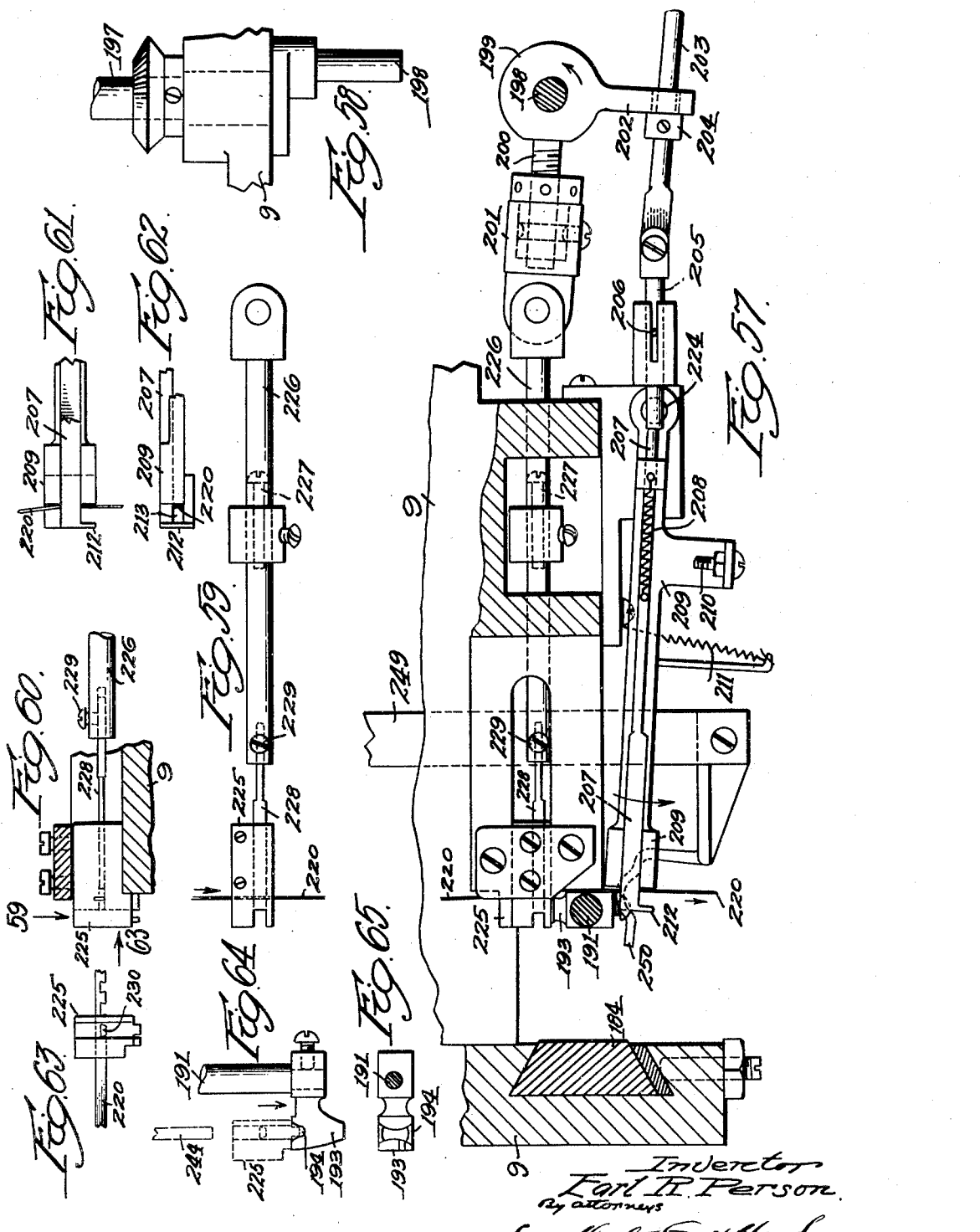

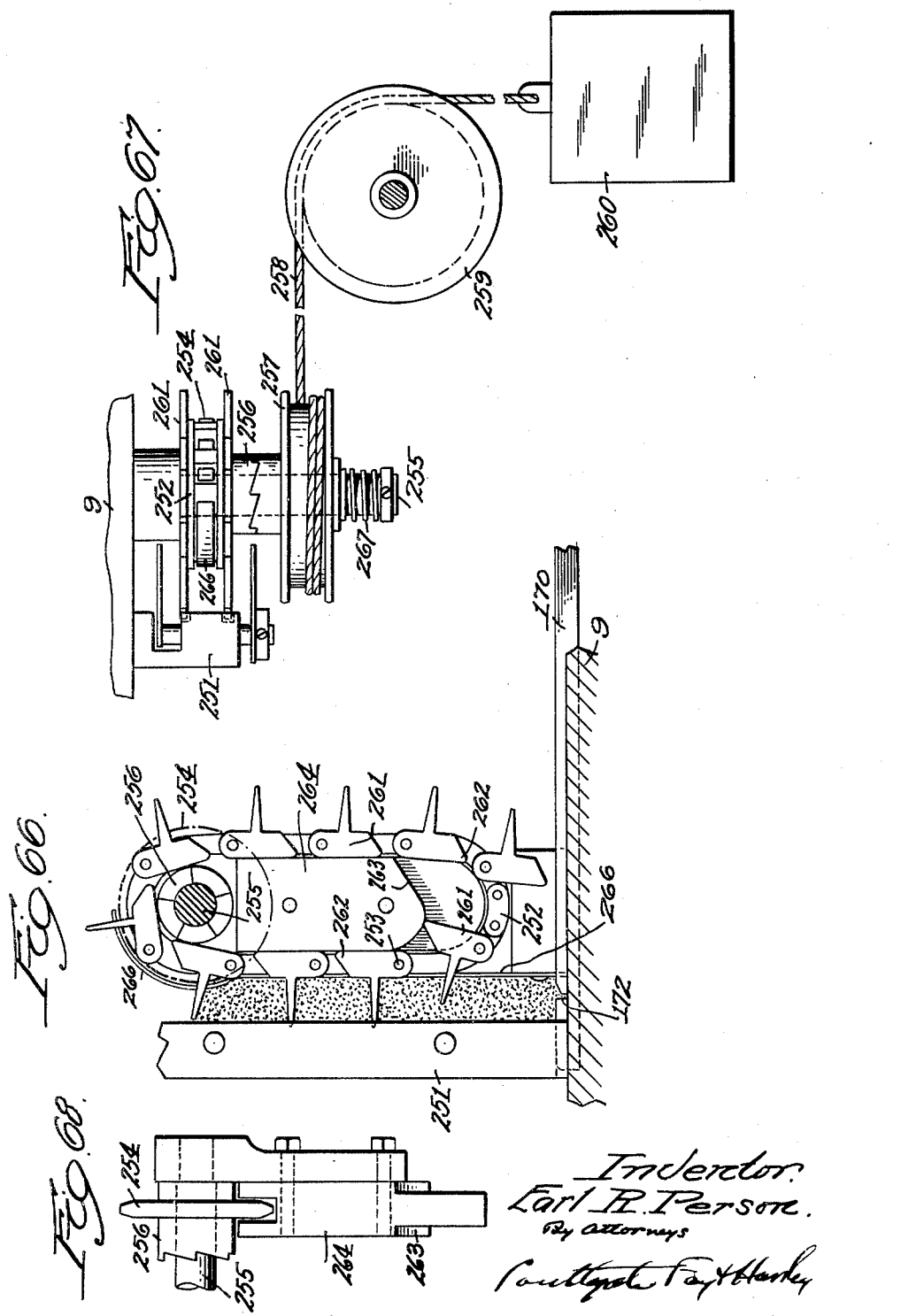

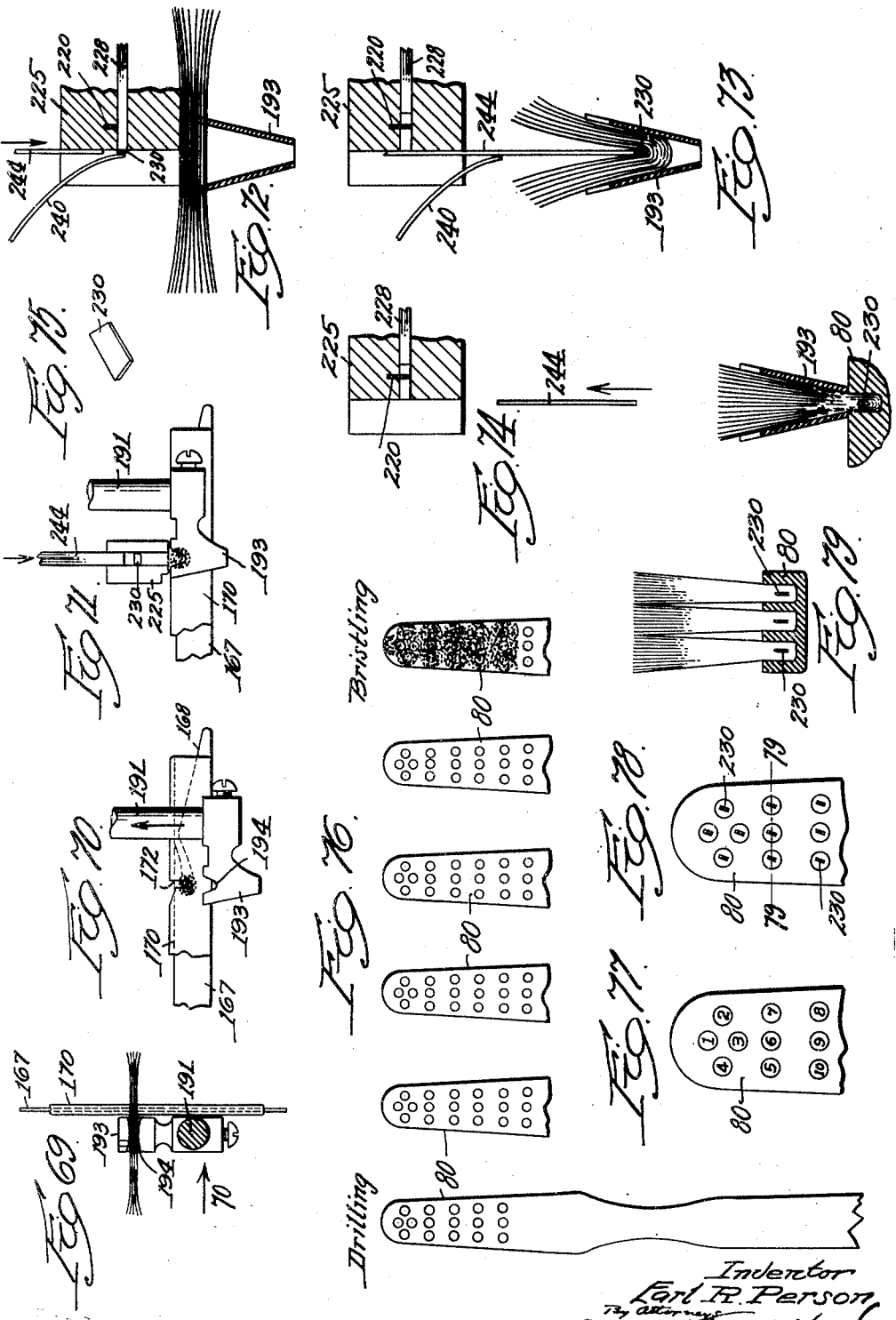

Patented Feb. 23, 1932

1,846,141

UNITED STATES PATENT OFFICE

EARL R. PERSON, OF LEOMINSTER, MASSACHUSETTS, ASSIGNOR TO DU PONT VISCOLOID COMPANY, OF WILMINGTON, DELAWARE, A CORPORATION OF DELAWARE

BRUSH BRISTLING MACHINE

Application filed December 21, 1928. Serial No. 327,667.

This invention relates to a machine for drilling brush backs and inserting bristles in a permanent condition therein.

The principal objects of the invention are to provide a machine which will operate continuously on the brush backs to drill the holes in a certain order and, while one brush is being drilled, insert the bristles in another in the same order and in which the operations are automatic so that the machine can work continuously on a series of brush backs without any necessity of stopping the machine during its ordinary operation; to provide means for rotating the drill, inserting the bristles, moving a series of brush backs which have not been drilled and a series of brush backs that have been drilled through the same path to receive the drill and bristles simultaneously and in the same manner and by a single source of power preferably; to provide holders for the brush backs which are adapted to be laid on a table and taken off by hand while the machine is operating, without stopping the machine or slowing it up, so that one holder containing several brushes can be going through the drilling operation while another one, not attached to it, but necessarily moving with it at all times and holding the same number of backs, will come into position to have the bristles inserted; to provide the holder moving mechanism in such a form that it will operate continuously, preferably being an intermittently rotating screw cooperating with a half nut on the back of each holder so that the two holders in operation will be held in contact with each other by the screw and intermittently moved forward by it while, at the same time, the table on which the screw is mounted is given a motion of translation at the proper time, either longitudinally or laterally, or both, to bring the brush backs under the drill and the bristle inserting mechanism in the proper sequence; to provide means whereby, when brush backs that have a concave surface or other irregular surface in the area of the bristles are being operated upon, the table, brush backs and holders will be given a motion automatically up and down so that the holes will all be drilled to the same depth and the bristles all be inserted to the same distance from the surface of the brush backs at all points; to provide the drill operating means in such form as to operate continuously while the rest of the machine can be stopped whenever desired; to provide a means for turning the screw and automatic means for starting and stopping the screw to shift the brush backs for shifting from one brush back to the next; to provide means whereby the bristles will be fed down through a chute or magazine and positively forced down at all times so that they will be fed into the bristle feeding means accurately and leave each tuft of bristles practically of the same size and an endless device for continuously moving plates down with the bristles to force them down and moving these plates out of the way automatically as they reach the bottom of the chute; to provide a picker operating at the end of said chute for automatically taking substantially the same number of bristles out of the bottom of the chute at each motion and carrying them forward to the place where they are to be inserted; to provide means for feeding a strip of metal through the machine, cutting out an anchor therefrom at each motion of the machine and placing it over the tuft of bristles while the latter are held in a straight unbent position; to provide means for holding the anchor in the proper place and a needle for engaging the anchor and forcing it down against the bristles and a nozzle into which the bristles are thus forced which doubles the bristles around the anchor and forms a tuft, said needle acting to force the bristles and anchor into the previously drilled holes in the brush backs and the anchor serving to hold them therein permanently; to provide means whereby these anchors are all inserted in an angular position so that they will not register with each other longitudinally and thus avoid weakening the brush back thereby; to provide the anchor in the proper shape and size to move easily into a hole drilled in the blank and to present upper angular corners to engage the walls of the drilled hole to resist displacement of the anchor and the tuft afterwards; to provide means for operating the magazine to force the bristles down therein; to provide means for holding the previously inserted bristles out of the way while a tuft is being inserted and to provide improvements in mechanism for performing each of these operations in the proper order.

Other objects and advantages of the invention will appear hereinafter.

Reference is to be had to the accompanying drawings in which

Fig. 1 is a plan of a bristling machine constituting a preferred embodiment of this invention;

Fig. 2 is a plan on a lower plane of the driving mechanism for the machine with parts in section;

Fig. 3 is a sectional view on the line 3—3 of Fig. 2;

Fig. 4 is a side view of the means for connecting the main shaft with the driving shaft and disconnecting it therefrom;

Fig. 5 is a plan of the worm gear and clutch and connected parts;

Figs. 6 and 7 are plan views of the two parts of the clutch mechanism;

Fig. 8 is an end view of one member of the clutch mechanism;

Fig. 9 is an opposite end view of the pawl carrying disc of the clutch;

Fig. 10 is an edge view of the same;

Fig. 11 is a view of the pawl by itself;

Fig. 12 is a plan of certain parts shown in Fig. 2 showing the index wheel for controlling one motion of the brush carrying table;

Fig. 13 is a side view of the index feed cam for operating the index wheel and associated parts;

Fig. 14 is an elevation of the index wheel shaft and associated parts;

Fig. 15 is a plan of two cams showing the way in which they move the brush carrying holder back and forth in two directions;

Fig. 16 is an elevation at right angles to Fig. 14 of the clutch and connected parts for controlling the operation of the parts above;

Fig. 17 is a horizontal sectional view on the line 17—17 of Fig. 14;

Fig. 18 is an end view of one member forming a part of the clutch;

Fig. 19 is a plan of part of the driving mechanism on top of the table shown in larger scale than in Fig. 1;

Fig. 20 is an end view of a disc and cam shown in Fig. 19;

Fig. 21 is a similar view showing only the front of the eccentric disc;

Fig. 22 is a plan of the end of the brush carrying holder and the driving parts therefor;

Fig. 23 is a front elevation of the same;

Fig. 24 is a sectional view on the line 24—24 of Fig. 22, of the mechanism for holding the shaft which moves the brush back holders;

Fig. 25 is a similar view, on the line 25—25 of Fig. 22, of the clutch mechanism;

Fig. 26 is a plan of the sprocket wheel and clutch section for driving the said screw;

Fig. 27 is a plan of a cooperating clutch section;

Fig. 28 is a plan of the cam on the screw shaft for operating the clutch;

Fig. 29 is an end view of the cam;

Fig. 30 is a plan of a detail for connecting this mechanism;

Fig. 31 is a plan of an adjustable cam plate for supporting the brush holder;

Fig. 32 is a plan of the holders for a plurality of brush blanks;

Fig. 33 is a sectional view on the line 33—33 of Fig. 32;

Fig. 34 is a front elevation of the mechanism at the top of the machine;

Fig. 35 is a front view of the drill head;

Fig. 36 is a plan of the shaft and associated parts for driving the bristle feeding and cooperating mechanism;

Fig. 37 is a side view of the means for raising and lowering the drill;

Fig. 38 is a side view partly in section of the bearings and supports for the drill shaft;

Fig. 39 is a detail sectional view showing the way the drill is held in position;

Fig. 40 is a plan of the lever for raising and lowering the drill;

Fig. 41 is a plan of part of the mechanism at the top of the machine;

Fig. 42 is an elevation looking from the end of the machine, showing the needle and nozzle operating mechanism;

Fig. 43 is an elevation of the anchor spring operating mechanism;

Fig. 44 is an elevation of the needle clamp;

Fig. 45 is a plan of half of this clamp by itself;

Fig. 46 is a side elevation of the needle operating cam and associated parts;

Fig. 47 is a side elevation of the slide cam and associated parts;

Fig. 48 is a plan of the mechanism shown in Fig. 47;

Fig. 49 is a side view of the bristle cam;

Fig. 50 is a plan of the picker mechanism;

Fig. 51 is a side view of the picker bar and associated parts;

Fig. 52 is a sectional view on the line 52—52 of Fig. 51;

Fig. 53 is a side view of the picker;

Fig. 54 is a plan of the picker bar holding a tuft of bristles;

Fig. 55 is a sectional view of the picker and picker bar showing the extreme forward position of the parts;

Fig. 56 is a side view of the picker bar and picker operating member;

Fig. 57 is a plan, partly in section, of the mechanism for drawing the wire through the machine and the die mechanism;

Fig. 58 is a side view of the eccentric for operating the parts shown in Fig. 57;

Fig. 59 is a plan of a die mechanism by itself;

Fig. 60 is a side view of the same;

Fig. 61 is a plan of the wire feeding device showing it in detail;

Fig. 62 is a side view of the same;

Fig. 63 is an end elevation of the anchor cutting die;

Fig. 64 is an end elevation of the die and nozzle;

Fig. 65 is a plan of the nozzle;

Fig. 66 is a side view of the bristle hopper and means for operating the bristles;

Fig. 67 is a plan of the means for actuating the bristle magazine;

Fig. 68 is a side view of part of the mechanism shown in Fig. 67;

Fig. 69 is a plan showing the operation of receiving the tuft of bristles in the nozzle while still held by the picker, the picker and picker bar being in the position shown in Fig. 55;

Fig. 70 is a side view of the same;

Fig. 71 is a similar view showing the next position of the parts;

Fig. 72 is a sectional view of the nozzle on enlarged scale showing the beginning of the operation of bringing the anchor down against the tuft of bristles;

Fig. 73 is a similar view showing the next position of the parts;

Fig. 74 is a similar view showing the tuft of bristles inserted in the brush and the needle starting back;

Fig. 75 is a perspective view of the anchor;

Fig. 76 is a plan showing a number of brush backs and the progress of drilling and bristling the same;

Fig. 77 is an enlarged plan of one of the brush backs with the holes drilled and numbered to show the order in which the operation takes place;

Fig. 78 is a similar view indicating the same brush back with the bristles and anchors in position, and Fig. 79 is a sectional view on the line 79—79 of Fig. 78 showing the brush with its tufts and bristles in place.

This machine is designed for drilling and tufting or bristling brushes at a high rate of speed. It is shown in the drawings as applied to the making of tooth brushes. The principle of operation is as follows:

The tooth brush blanks are placed in sets of eight, or any other number, on holders which can be applied to the machine at leisure as the machine is running and will then be carried through and in one position drilled. These holders are shifted back and forth to get them into the various positions for inserting the drill and placing the tufts in the brush backs in the desired order. They are also fed along the machine intermittently as each brush is completed and when one set is all drilled and tufted that holder can be taken out by hand immediately or at any convenient time and placed to one side.

The tufting is done by the aid of a metal anchor which is cut out of the edge of a flat strip of metal by this machine and pressed down on the center of a tuft of bristles laid out in flat position. It is then forced down into the previously drilled hole in the brush and doubles the bristles over and firmly anchors them in place. These anchors are set in angular position so that they will not have a tendency to crack the brush backs longitudinally or transversely.

This machine is capable of great production as the above mentioned operations are practically continuous and automatic and the machine does not have to be stopped for loading or unloading the brush blanks or the holders in which they are carried.

Driving mechanism

Referring particularly to Fig. 2, the machine is shown as having all its parts operated by a single motor 10 carried by the frame 9 having a flat top over the motor. Many of the parts are supported directly on the table top. The motor, through a flexible connection 11, drives a shaft 12 on which is a worm 13 driving a worm gear 14 on a longitudinal shaft 15.

It may be stated at this point that the shaft 12 carries attached thereto a pulley 16 which drives a flexible round belt 17 over idlers 18 and constantly drives a pulley 19 carried on a spindle 20 which carries the drill 21. Consequently this drill is operated all the time when the motor is running. The belt has a long strand which can be raised and lowered on account of the idlers and pulley 19 which is necessary because the drill is arranged to move up and down for the purpose of this machine.

The motor is intended to run continuously and power is transmitted through a clutch 27 to a main shaft 28 in alignment with the driving shaft 15. This is a rocking key clutch controlled by a bell crank 29 and a slidable rod 30 which can be manipulated by its knob to stop all of the machine except the drill and to start it.

Clutch

The bell crank 29 has a spring-pressed head 31 which has to be raised from the position shown in Fig. 4 to stop the shaft 28. The clutch 27 comprises a rocking key 33 having a point 34 thereon carried by the clutch. Normally it is located in the position shown in Fig. 4 but when the head 31 is moved up into the path of this key, it forces it to turn against resistance of a spring 35 and to disconnect the shaft 15 from the shaft 28.

The key 33 has bearings 23 on which are carried in the clutch member 27 and its cover 24. The member 27 is slabbed off along a plane 25. The point 34 is in the form of a long wedge one side of which will bear on the surfaces 25 when the key 33 is pressed out in the position shown in Fig. 4 by the spring 35. This is the normal position.

On the end of one of the bearings of the key 33 is a projection 32 which runs in an eccentric recess 36 in a plate 37 which is fixed to the end of the shaft 15, the clutch section 27 being located on the shaft 28. When the spring 35 pushes the key 33 out, as is the usual condition, this projection 32 is forced by spring pressure against the surface of the recess 36 and when it reaches either one of two notches 38, the projection 32 will enter the same. This is what clutches the two shafts 15 and 28 together. Obviously when the head 31 engages the key 33 and swings it back to the position shown in Fig. 9 it will also swing the projection 32 out of the recess 38 and disconnect the two shafts.

Brake

When the rod 30 is pulled out to disconnect the shaft 28 it also applies a brake to stop it at once. The bell crank 29 is mounted on a rod 40 which extends along the machine and is provided with an arm 41 carrying a roll 42. When the rod 40 is turned to disconnect the shaft 28 it brings the roll 42 away from a bar 43 on a pivoted brake 44 and allows a spring 46 to force the brake against the surface of an index feed cam 45 on the shaft 28 as shown in Fig. 13. The brake is normally held away from this cam by the roll 42. The spring 46 is attached to a pin 47 on the frame.

Indexing means

The cam 45 actuates the cam roll 48 which is carried by a pin supported at the lower end of a depending pivoted link 49 and connects the link with a reciprocable rod 50. This rod is mounted to slide in a guide 51 on the frame and is provided with a pivot pin 52 which engages in a slot in an arm 53 pivoted freely on a shaft 54. This arm has a spring pawl 55 for engaging in notches 56 in an index feed wheel 57 fixed to the shaft 54. At each oscillation of the rod 50 therefore the wheel 55 is turned the distance between two notches. As will be explained later, there are shown 29 notches on this wheel and it controls certain features for making a tooth brush having twenty-five tufts of bristles.

Pattern mechanism

Also fixed on the shaft 54 is a pattern cam 58. This has an irregular outline and is adapted to actuate a roll 59 on a lever 60 pivoted at a stationary point on the top of the frame. At the other end this lever has a roll 61 which bears on a plate 62 adjustably carried by a projection on a longitudinally movable slide 63 running on rolls 64, Fig. 22. The pattern cam 58 has twenty-nine stations like the index feed wheel 57, twenty-five of which are employed for positioning the slide 63 for the drilling of twenty-five holes for the insertion of twenty-five tufts of bristles. The other four stations are employed for a different purpose, as will appear.

On the shaft 54 is also fixed another cam 65 which operates a roll 66 on a rod 67. This rod is guided in bearings on a part of the frame 9 and adjustably bears on a lower carriage 71 slidably carrying the slide 63. This cam 65 has the equivalent of twenty-nine stations, twenty-five of which are active during the drilling and bristling. They are arranged in sets of three throughout most of the circumference, in the form shown.

The top of the frame 9 is provided with a plate 69 on which are two adjustable cam surfaces 70 on each side, one at the front and one at the back. The carriage 71 has rolls 72 which rest on these cam surfaces and therefore as this carriage moves laterally its height is controlled by its position over the cams 70. They are shown in this instance as simply raising the carriage at a certain point in its travel so as to bring the tooth brush blanks, as will appear later, higher near the center of the transverse travel. This is done for the purpose of bringing their upper surfaces always to the same level and is necessary in the present instance because these brush surfaces are concave. This insures the drilling of the holes all to the same depth.

The laterally movable carriage 71 carries guides 68, which guide the slide 63. The carriage 71 carries guide rolls 69ª. A spring 73 is employed to always bring this carriage back as far as possible so that the roll 66 will never leave the surface of the cam 65.

Thus it will be seen that by the two motions above described, the slide 63 can be moved laterally and longitudinally and it is arranged to support the tooth brush holders.

This slide is provided with a spring 74 for constantly moving it forward to keep the adjustable plate 62 in contact always with the roll 61. This plate has a bearing surface for the roll 61 perpendicular to its line of motion and long enough to contact with the roll at all points in its lateral motion. The slide 63 has bearings at its ends in which is slidingly journalled a longitudinal threaded shaft 75.

Brush holders

The brush backs are carried in a series of holders 76, provided with a plurality of seats on their upper surfaces shaped to fit the back of the bristle holding parts of the brushes. Each of these holders is provided with gibs 77 arranged longitudinally which fit in finished surfaces or ways on the slide 63 so that it can be fed therealong. On its under surface it has a half nut 78 meshing with the square-threaded screw 75 so the turning of this screw will feed the holder longitudinally in addition to the movement of the slide itself.

On the top of each holder is a plate 79 having undercut recesses or notches for receiving the forward ends of the brush blanks 80. On the front it has a plurality of spring-pressed grips 81 which engage the opposite edges of the brush backs at the end of the brush section where the brush backs are contracted to form the neck. On account of the springs with which each one is provided, they tend to urge the ends of the brush backs into the notches and hold the brush backs firmly in position as shown in Figs. 32 and 33. Each grip has a handle 82 for releasing it to insert and remove the blanks and brushes.

Each one of these holders carries a certain number of brush backs, those illustrated carrying eight. The holders are held down on the slide 63 by side plates 83 so that ways are provided for guiding them along.

It may be stated here that in operation one of these holders containing eight brush backs is placed at the side of the machine or elsewhere and, when a holder is going through, a new one is placed at any time in position on the screw and at the left of the ends of the guides 83 and up against the edge of the one in process. This is then fed along automatically and no attention need be paid to it at or near the time when the drilling is commenced or the tufting finished.

Screw operating means

On the shaft 28 is a sprocket wheel 85 Fig. 1 carrying a chain 86. The chain constantly runs a sprocket wheel 87 which is on a shaft 88. This chain is longer than the distance between the two sprocket wheels and is always held taut by a spring-pressed take-up sprocket wheel 89 carried by an arm 90 pivoted on a bearing of the shaft 28. This allows for the shifting of the shaft 88 with the carriage 71. A bearing 91 for the end of the shaft 88 is carried by a bracket 92 on the carriage 71 and at some distance therefrom.

The shafts 88 and 75 are in alignment. On the inner end of the shaft 88 is a clutch section 94 having a cylindrical internal surface. On the shaft 75 is keyed a disc 95 having a cam 96 upon it, said cam having in this instance six projecting cam surfaces around the circumference. This cam is located inside a loose cam 97 which is provided with spaced projections 98. In the spaces between these projections and also in the hollows of the cams 96 are a series of clutch rolls 99. These clutch rolls are adapted to be projected by the several lobes of the cam 96 against the interior section of the clutch 94 to clutch the rotating shaft 88 to the screw shaft 75 and rotate the latter.

The shaft 75 is normally held stationary against rotation by a pivoted arm 100 having a projection 101 entering a notch 102 in the disc 95. A spring 103 holds the arm 100 yieldingly in this position. On the disc 95 is a pin 104 connected by a spring 105 with a pin 106 on the cam 97 which otherwise is loose on the shaft.

On the slide 63 is a bracket 107 on which is pivoted a bell crank 108 having a roll 109 which, when the cam 58 comes to a point to allow the roll 59 to move toward its center and thus move the slide 63 to the left in Fig. 1, will move the bell crank up so that the roll 109 engages a stationary stop 110 carried by the stationary plate 69. This action pulls the bell crank 108 over so that its opposite end engages a pin 111 on an arm 112 which is pivoted to the bracket 92 like the arm 100 and is also provided with a spring 113 for holding it inward toward the shaft 75. This action swings the arm 112 back so that a spring-pressed head 114 thereon comes down out of the position shown in Fig. 25. By the action of the spring 105 the cam 97 is pulled part way around as shown in that figure. This causes the rolls 99 to ride up on the lobes of the cam 96 and clutches the shafts together.

The arm 112 is provided with a pin 115 extending behind the arm 100. Therefore when the arm 112 is moved back the arm 100 is also moved back and the projection 101 no longer prevents rotation of the screw shaft 75.

By this it will be seen that the two shafts are clutched together by the independent movement of the cam 97 and the shaft 75 is released as the clutch opens. This shaft 75 therefore will be turned by the constantly rotating sprocket wheel 87. This rotation continues until the cam 58 pushes back the roll 59 and releases the roll 109 from the stationary stop 110. This does not take place, however, until the shaft 75 has completed more than one complete revolution. The cam 58 is designed so as to allow this much rotation to take place. Then, at the end of the second revolution, the projection 101 and head 114 will snap into the notch 102 and under the cam 97 respectively.

The projection 101 stops the shaft 75 positively at exactly the end of two revolutions. The shaft 75, taking with it the cam 96 and the disc 95, rotates positively but the arm 112 can move back ahead of the arm 100 and stop the cam 97. The slight continued motion of the cam 96 allows the rolls 99 to drop into the depressions and the clutch is thereby disconnected. Now the shaft 88 continues to rotate and the projection 101 positively stops the shaft 75.

The effect of this action is to rotate the screw 75 two complete revolutions. The pitch of the screw on this shaft is such as shown that two revolutions of it will move the nuts 78 which are in contact with it and the holders 76 a distance such as to bring the next tooth brush blanks of each set, into such position that the drill will be properly placed to drill the first hole in one of them in the position desired and the tufting mechanism will put the next tuft in the first hole in another blank, in the corresponding position.

Drill control

On the main shaft 28 is a bevel gear 113 which, through a companion gear, drives a vertical shaft 115. In line with the shaft 115 is a shaft 114 which, as will be seen later, controls the vertical position of the drill and also the tuft setting mechanism. A face cam 116 on the shaft 54 has a horizontal upper surface which is interrupted by a depression 117. This cam can be considered as being divided theoretically into twenty-nine equal parts, four of which are taken up by the depression 117. This depression is arranged to correspond to the four extra or idle stations on the cams 58 and 65, and when they are in action a cam roll 118 on a vertical rod 119 comes down into this depression 117. This allows a spring 120 to swing a bell-crank 121 from the position shown in Fig. 14 so that the opposite end of this bell-crank, which engages in an opening 122 in a pivoted arm 123, will force this arm back. This arm has a lug 124 which, when it is pulled out, as in the normal position shown in Fig. 14, will engage a roll 125 on a brake segment 126. This takes the brake off a disc constituting part of the clutch 127 fixed on the shaft 114 in opposition to a spring 129, thus leaving the shaft 114 free to be rotated. The arm 123 is pivoted on a bracket 139 on the frame 9. There is an upper bearing for the shaft 114 on a bracket 140 on the top of the frame 9.

The clutch between the shafts 114 and 115 is substantially the same as the clutch shown in Figs. 4 to 11 inclusive and it involves the part 127 on the driven shaft 114 and a disc 137 on the driving shaft 115. It will be noted that these parts are similarly numbered to those in Figs. 4 to 11, there being one hundred points difference in the numbering. The disc 137 is provided with a depression 136 therein and a single notch 138 instead of two notches as in the other case.

The pawl 133 is constructed in the same way as the pawl 33 and is operated by a spring-pressed head 131 on the arm 123 to stop and start the shaft 114. When the arm 123 is pulled out, which is the normal position, the spring-pressed head 131 is pulled away from the pawl 133 and that pawl is located in its outer position where it does not prevent the connection of the clutch. The clutch operates in the same way as shown in said figures. Therefore it will be seen that with the parts in the position shown in Fig. 14, the shafts 115 and 114 are clutched together, so that the shaft 114 is rotating all the time except when the roll 118 is located in the depression 117 and during those four stations the shaft 114 is stopped.

On the shaft 114 is a bevel gear 141 which meshes with a bevel gear 142 on a sleeve 135 loose on a shaft 143 carried on the top of the frame, and it will be noted that this shaft is set at an angle to the direction of motion of the brush holders. This shaft has a handle 144, or squared end on which a handle can be placed, for adjusting it by hand when disconnected from the shaft 115 which drives it.

On the sleeve 135 is a cam 145 which operates a cam roller 146 on a lever 147 pivoted on the bracket 140. The opposite end of this lever has a fork 148 which engages and moves up and down a cylindrical slide 149 which is provided with ball bearings 150 for the drill spindle 20 and carries this spindle up and down with it. The weight of the spindle is counterbalanced by a spring 151 to help to pull the spindle up and, as previously described, this spindle is rotated constantly by the belt 17 and pulley 19.

It will be seen, therefore, that the drill will be raised and lowered once during each rotation of the sleeve 135 and also during each rotation of the shaft 114 except at such times as the shaft 143 is disconnected from the latter. The drill is held in adjusted position by a screw 154.

The sleeve 135 is provided with a clutch section 151, which cooperates with a clutch section 152 slidably keyed to the shaft 143. A handle 153 having a pin 153$^a$ for sliding the clutch section 152 controls the connection of the shaft 143 with the power through the gear 142. This is a hand operated connection and is used when it is desired to disconnect this shaft and operate the bristle mechanism to see that the parts are properly adjusted.

Picker mechanism

On the end of the shaft 143 is a spiral gear 155 driving a spiral gear 156 on a cross shaft 157. This shaft, by bevel gears 158 drives a longitudinal shaft 159 having its bearing on a bracket 218. On the end of the shaft 159 is a disc 160 operating a connecting rod 161. This rod is connected with a slide 162 mounted to move in transverse ways 163 on the top of the frame 9 of the machine. This slide is provided with a pair of supports 164 extending sideways and carrying a bar 165 secured thereto by bolts 166. The bar 165 extends down at the end and projects at all times into a notch 166$^a$ in the picker 167. This picker has an inclined forward end 168 and a reversely inclined bristle receiving notch 169.

This picker will reciprocate positively with the bar 165.

Picker

A picker bar 170 of inverted U-shape, with the open side at the bottom, runs in a slot in the table of the machine. The picker 167 is housed within the channel thus provided and is of uniform height and just fits within this space or channel. The bar 165 operates this whole mechanism. It starts from the position shown in Fig. 50 and moves forward to the left until the bar 165 engages an edge 171 of a slot in which this bar moves. At that time the picker bar, which previously has been stationary, is picked up by this bar 165 and started along. At that point the two members 167 and 170 are in the relative positions shown in Fig. 55.

A vertical notch 172 in the picker bar has received the bristles therein which fill the notch and the space above the slant at the edge of the notch. The notch 169 in the picker is moved over so that the point just above it will pass across the top of the notch 172 and force the bristles down into the almost circular part in the bottom of the notch 172 which does not extend down as far as the notch 169 as shown in Fig. 55. This compresses the bunch of bristles. The continued motion of the bar 165 forward carries the picker and picker bar, still in the same relative position, out forward as shown in Figs. 55 and 69 where the bunch of bristles is removed as will appear.

At the other end of the stroke a latch 174 is forced by a spring 175 into locking position and engages a lug 176 on the picker bar. This holds the picker bar against moving. This latch is unlocked on the movement of the bar 165 with the picker over to a position in which the inner side of the vertical end of the bar 165 engages an enlargement 177 on the latch 174. At the other end of the stroke a spring latch 178 engages a projection 179 on the other side of the picker bar and holds the picker bar in its forward position. Finally the outer surface of the vertical end of the bar 165 operates on a projection 180 on this latch 178 to release it.

In the operation of this mechanism, the picker bar, being locked in its rearmost position by the latch 174 as shown in Fig. 50, the bar 165 moves forward taking with it, of course, the picker. When it reaches the position ready to engage the surface 171 the other side of the bar 165 engages the projection 177 and unlocks the picker bar. Now the picker and picker bar move forward to the position shown in Fig. 55 where the bunch of bristles is held firmly in their notches. At that instant, the latch 178 has engaged the projection 179 which is then way forward and holds the picker bar. Now as the bar 165 moves back it takes the picker with it but not the bar 170 until it reaches the surface opposite the surface 171. Then it picks up the picker bar and moves it back to the position shown in Fig. 50 where the latch 174 locks it there. This lost motion arrangement is designed to provide a simple and convenient means for securing the necessary order of steps in picking up a tuft of bristles and holding them in the position shown in Fig. 54, ready for other agencies to act upon them.

The straight bunch of bristles is now held by the picker in horizontal position. It may be noted from reference to Fig. 69 that the picker bar holds the bristles at a point at one side of the center.

Nozzle operation

Now on the shaft 143 is a double cam 180. On one side of this cam is a nozzle cam groove 181 which operates a lever 182 to move up and down a link 183 which is adjustably connected with this lever. This link is arranged vertically and has a horizontal projection 184 at the bottom which has a head 185 running on a vertical rod 186. This head is separated from a slide 187 by two springs 188, one on each side, so that the slide 187 will be operated by the link 183 in both directions, but yieldingly. The slide 187 moves in vertical ways on the frame. The rod 186 has a stop head 189 which engages a horizontal stop 190 on the downward stroke to positively limit it in its downward direction.

The slide 187 carries a vertical nozzle rod 191 which is adapted to be adjusted vertically in its attachment to the head and held by screws 192. This nozzle rod carries at the bottom a nozzle 193. This nozzle is of conical form, open at both ends, and with the upper end larger than the lower. It is operated by the cam 181 to come up into position under the bristles held horizontally by the picker bar, as shown in Figs. 69, 70, 71 and 72, and to engage this bunch of bristles exactly in the center thereof. The top of the nozzle is provided with a notch 194 all the way through, the walls of which are rounded off at the ends to receive the bristles. It is held yieldingly up against them by the action of the springs 188. This position shown in Fig. 71 is the next step after the picker and picker bar are forced forward into the position shown in Figs. 55 and 69.

It will be seen, therefore, that at this time the nozzle is located under the center of the straight horizontal bunch of bristles which is still held by the picker and picker bar, and that the motion of the picker previously described will draw the picker backwardly from the position shown in Fig. 54 and leave the bristles in the vertical notch 172, so that they can be raised out of it.

Anchor mechanism

The next step is to provide a metal anchor and place it on the bristles at the center and then force it down to double over the bristles as they pass through the nozzle to form them into a tuft. The rod 191 is moved up to take the bristles out of the notch 172 and free them from the picker bar which then moves back to the rear.

On the shaft 159 is a second gear 196 driving a vertical shaft 197 which has on the end an eccentric provided with an eccentric pin 198. This pin swings a disc 199 in a horizontal plane. This disc has a screw 200 entering a head 201 which is confined in its movements sufficiently so that the disc necessarily keeps in the same position otherwise while it is rotating with the eccentric pin. It has a projection 202 perforated to receive a pin 203 which has a fixed collar 204 so that the projection 202 will force this pin to the left in Fig. 57 when the eccentric pin rotates through one half of its revolution. This pin is pivotally connected with a reciprocable rod 205 which, by a pin and slot connection 206, is kept from turning and presses on a spring-pressed rod 207 that holds the collar 204 against the projection 202 on account of the action of a spring 208. The rod 205 reciprocates in a straight line but the pin 203 swings and also the rod 207. This rod 207 is mounted for reciprocation in bearings on a frame 209 swinging on a vertical pivot 224 and having a screw 210 projecting horizontally. The frame 209 has a projection and spring 211 connected with a stationary part of the frame 9 to swing it when free to do so into the position shown in Fig. 57. The end of the rod 207 has a projection 212 adapted to come back against the end of the frame 209 for a purpose to be described and is also has a transverse passage 213 therethrough at a distance back of this end.

On the inside of the wheel 160 is a cam groove 215 which operates a roll 216 to swing a bell crank 217 pivoted on a stationary lug on the bracket 218 which supports the shaft 159. On the end of this bell crank is a projection 219 which engages the screw 210, at a certain period in the revolution of the shaft 159, and forces the whole frame 209 back in the direction of the arrow in Fig. 57.

The opening or hole 213 is for the reception of a flat wire or strip 220. This is wound up on a reel 221 which is provided with a friction device to prevent its free unwinding and delivers the wire strip into a hollow guide 222 and from that through a passage in the die 225 to the passage 213. Obviously when the rod 207 is drawn back far enough so that the wire or strip 220 is clamped between it and the end of the frame 209 and that frame is swung over on its pivot 224 the wire will be pulled through a certain distance. This carries the wire one step forward and pulls it through the die 225 as stated.

Die mechanism

This die is also actuated by the eccentric pin 198 through the eccentric disc 199. The head 201 with which this disc is connected is pivoted on a rod 226 which slides in a stationary part of the frame and is provided with an adjustable stop screw 227. This rod is provided with an opening in its end in which the shank of a cutting tool 228 is held by a screw 229. This cutting tool 228 is located in a passage in the die 225 through which the wire strip 220 is moved in the manner just indicated. This die is provided with a notch of trapezoid form and the cutting tool 228 is of the same form. The strip 220 is wide enough so that the cutting tool can pass through the die and cut out trapezoidal anchors 230 from the strip 220 and leave the back of the strip intact so that the waste can be pulled through and discharged in any desired way. This anchor is pushed forward by the cutting tool 228 until it comes exactly to the edge of the die 225 as shown in Fig. 72.

Anchor feeding mechanism

The double cam 180 on the shaft 143 has on the opposite side a needle cam groove 232 operating a lever 233 which moves a slide 234, adjustably connected with it, to reciprocate vertically in the upper part of the ways carrying the slide 187. This slide 234 is provided with a pin 235. This pin engages on a collar 236 adjustably mounted on a vertical rod 237. This rod is pressed down by a spring 238 engaging the top of this collar and a fixed rod above. At the upper end the rod has an adjustable stop 239 and at its lower end it is provided with an anchor spring 240. Now at the time when the anchor 230 comes into the position shown in Fig. 72 this anchor spring which has a convex shape has come into position against the opening in the die 225 in which the cutting tool 228 passes. The anchor 230 is held at this instant by spring pressure of the spring 240 against the end of the cutting tool 228 as shown in Fig. 72.

The slide 234 is provided with a head 242 and on this is fixed a needle rod 243 which carries a needle 244. The needle 244 is held on the rod 243 by a clamp consisting of two parts 245 and 246. The former is fixed integral with the rod 243 and the part 246 is adapted to be secured to it by a screw 247. The needle has a flat end and a shape corresponding with the shape of the top surface of the anchor and it comes down at this instant in accordance with the operation of the cam and engages the top of the anchor. This is just about to take place in Fig. 72.

As this needle moves down the spring 240 moves down with it a certain distance and until the stop 239 comes to its limiting position and then the slide 234 with its pin 235 can move further down. They take the needle 244 with them and push the anchor against the top of the bunch of bristles shown in Fig. 69 at the center thereof. Then the needle and anchor force the bristles down through the nozzle 193, as shown in Fig. 73 and finally clear down into the brush blank as shown in Fig. 74. Then the needle ascends again as shown in that figure. This is all that is necessary in order to force the tuft of bristles into the brush and anchor them permanently therein.

The object in turning all this mechanism at an angle as shown in Fig. 1, is to insure that these anchors will assume the position shown in Fig. 78 and thus not all be in alignment across or longitudinally so that they will not tend to crack the brush back.

Bristle separator

The above, as shown, is the entire operation of forming the tuft and setting it into the brush. In order to keep the tufts previously inserted out of the way, the shaft 143 is provided with a cam 247' which acts on a roll 248 to operate a slide 249. This slide extends transversely through the machine from back to front and carries a bristle holder 250 which, moves back and takes the tufts, just previously set, out of the way so that there will be no interference with the new tuft of bristles being set.

Bristle magazine

It has been stated that the bristles have been taken from a bristle holder or magazine. This is shown in Figs. 66, 67 and 68. It comprises a vertical magazine 251 having three sides. The other side is open but a spring 266 held at the bottom presses the bristles inwardly. An endless chain composed of links 252 pivoted together by studs 253 passes around a sprocket wheel 254 at the top for operating the chain. This wheel is loose on a shaft 255 on which is a ratchet clutch member 256 registering with the corresponding member on a drum 257 loosely mounted on the shaft 255. This drum can be moved back against a spring 267 for winding up the cable 258 which is wound on it. This cable is passed over a pulley 259 and is provided with a weight 260 which normally acts to unwind the cable and turn the wheel 255 under the action of the weight.

This action therefore tends to move the chain in a downward direction along the outward side of the magazine. On the links are pivoted members 261 which have projections extending out horizontally in the magazine to bear down on the bristles therein so as to carry them down positively. They also have projections 262 engaging a stationary cam plate 263 so that as they move around the bottom of a guide 264, which holds the links 252 in position, the plates 261 will swing over by gravity as shown at the bottom in Fig. 66. This cam plate 264 holds these members 261 in vertical position while in the magazine.

In this way the bristles are forced down and pressure applied to them so that when the picker and picker bar come under them the bristles will be forced into the notches therein as stated above.

Operation

By reference to the last sheet of drawings the operation of taking the straight bunch of bristles, supplying it with the anchor and forcing it into the nozzle 193 to double over the bristles in the form of a tuft and then force this tuft into the brush blank is fully shown.

Fig. 76 shows a set of brush blanks as they are located in the holders with the first blank of one set partly drilled and the corresponding blank of the second set partly supplied with tufts of bristles. The order in which these are set are indicated by the numbers 1, 2, 3, etc. shown in Fig. 77 and the position of the anchors is shown in Fig. 78. The other operations have been described in detail in connection with the description of the mechanism and need not be referred to further.

It will be seen that the brush holders are placed on the machine by hand, the brush blanks being previously inserted and that the drilling and tufting goes on automatically and continuously as long as the machine is in operation. The only things necessary to do are to supply bunches of bristles to the magazine and to supply the holders with brush blanks and place them in a convenient position for the operator. The operator puts the brush holders on the screw at any convenient time, so that the new holder will fit against the one being operated upon, and removes the completed holders at any convenient time thereafter. The wire or strip of metal for forming the anchors is supplied from the coil located on the reel and the waste is delivered from one end of the machine where it can be caught in a can or otherwise disposed of, all in a continuous piece, if desired.

The machine is capable of great capacity and in view of the various actions required of it is of a very simple character. It can run at high speed and, as the operator seldom has to stop the machine, the production is large. If a brush blank gets loose or if for any reason one has to be thrown out, the machine is stopped very easily by the manipulation of the handle and when it is started up again the entire starting of the machine is performed by moving this handle back to operating position. When it is out the drill continues to rotate, but no other parts are in operation.

On the other hand the shaft 143 can be run by hand by means of the handle 144, it having been first disconnected from the power by the handle 153.

The control of the machine to drill the blanks and set the bristles in the proper place and in the proper order is all accomplished by the three cams 58, 65 and 116 all on the same shaft and all designed to secure these results. As shown, these cams have twenty-nine stations, four of them being arranged for the stopping of these parts after a complete brush is bristled in one holder and drilled in another and while the screw is turning to move the holders along for the next drilling and tuft setting operation at the other end of the next brush. No difference is made in the operation when the machine transfers its operations from the last brush blank on one holder to the first one on the next, the holders being designed so that the space between two brushes in two different holders is the same as that between two brushes on one holder.

Although I have illustrated and described only one form of the invention I am aware of the fact that modifications can be made therein by any person skilled in the art without departing from the scope of the invention as expressed in the claims. Therefore I do not wish to be limited in this respect but what I do claim is:—

1. In a brush bristling machine, the combination with a carriage, means for moving said carriage laterally, a slide carried by said carriage, means for moving said slide longitudinally on the carriage, holders for brush blanks slidably mounted on the slide to move longitudinally and means on the slide adapted to engage a plurality of said holders at the same time for moving said holders longitudinally independently of the motion of the slide and the motion of the carriage.

2. As an article of manufacture, a brush holder for a bristling machine having means along one side for receiving the forward ends of a plurality of brush blanks and a plurality of yielding means along the opposite side, each one for engaging and yieldingly forcing one brush blank forward and having a shaped seat adapted to exactly fit the back of the brush at the point where the bristles are to be inserted.

3. In a brush bristling machine, the combination with a drill for drilling brush blanks and a reciprocable carriage, of a slide supported by the carriage, means for moving said carriage, a series of holders for brush blanks movably mounted on the slide, cam surfaces for raising and lowering the carriage to insure that the drill shall penetrate the brush blanks to equal depths when the brush blanks are not flat and rollers on the carriage resting on said cam surfaces, whereby said surfaces control the height of the carriage in accordance with the different positions thereof forward and back.

4. In a brush bristling machine, the combination of a reciprocable slide having ways therealong, a brush holder resting in and slidable along said ways, said brush holder having a half nut on the under side, a screw with which said half nut meshes, whereby when the screw is not turning the holder is fixed with respect to the slide, but it can be moved along the slide by the rotation of the screw, a plate along the top of the brush holder having notches for receiving the ends of the brush blanks and spring-pressed clamps on the brush holder for engaging brushes at the neck portion thereof and holding them against said plate, said holder having a seat of the shape of the brush blank between said plate and clamp to support the brush blank firmly at all points back of the places in which a drill is to enter.

5. In a brush bristling machine, the combination with a frame, of a carriage movable laterally on the frame, a slide movable longitudinally on the carriage, a longitudinal screw carried by said slide, a brush blank holder having a half nut fitting said screw and provided with means for supporting a plurality of brush blanks, and means for rotating the screw to move the holder along the slide.

6. In a brush bristling machine, the combination with a frame, of a carriage on the frame, a slide on the carriage, a screw carried by said slide, brush blank holders, each having a half nut fitting said screw and each provided with means for supporting a plurality of brush blanks, means for moving the carriage laterally, means for moving the slide longitudinally, and means for rotating the screw to move the holders along the screw when the slide and carriage are not moving.

7. In a brush bristling machine, the combination of a frame, a carriage movable transversely on the frame, a slide movable longitudinally on the carriage, holders for a series of brush blanks mounted on the slide to move therewith, means for drilling a blank, means for simultaneously inserting a tuft of bristles in a corresponding position in another blank and means for independently moving the holders along the slide to place one holder in a position formerly occupied by another.

8. In a brush bristling machine, the combination of a reciprocable slide having ways therealong, a brush holder resting in and slidable along said ways, said brush holder having screw threads, a screw with which said threads mesh, whereby when the screw is not turning the holder is fixed with respect to the slide, but it can be moved along the slide by the rotation of the screw.

9. In a brush bristling machine, the combination of a series of holders for the brush blanks, each having means for holding a plurality of brush blanks thereon, a device for moving the holders along in a direction transverse to the length of the brush blanks, said holders having means for engaging the moving device so that each two holders are in close contact end to end, the spaces between the brushes on each holder being equal to the space between the last brush on one holder and the first brush on the next when engaged with said moving device.

10. In a brush bristling machine, the combination of a carriage, a slide mounted to move thereon, means for moving the carriage in one direction, means for moving the slide in another direction on the carriage, a holder for brush blanks slidably mounted on the slide but normally movable therewith, a screw for moving said holder relatively to the slide, said screw being normally at rest, and means for automatically starting the screw to rotate when the slide has moved to a certain point.

11. In a brush bristling machine, the combination of a series of holders for brush blanks, a screw for moving said holders, said screw being normally at rest, means for automatically starting the screw to rotate, and means whereby the screw is automatically stopped from rotating.

12. In a brush bristling machine, the combination of a carriage, a slide mounted to move thereon, means for moving the carriage in one direction, means for moving the slide in a direction at right angles thereto on the carriage, a series of holders for brush blanks slidably mounted on the slide but normally movable therewith, a screw for moving said holders relatively to the slide, said screw being normally at rest, means for automatically starting the screw to rotate when the slide has moved to a certain point, and means whereby the screw is automatically stopped from rotating.

13. In a bristling machine, the combination with a shaft, a clutch section thereon, a screw in alignment therewith and having a clutch section, a slide on which said screw is journalled, means for moving the slide, a brush back holder having a threaded portion to fit said screw, whereby the rotation of the screw will move the holder along the slide, a lever carried by said slide, a stationary stop in position to be engaged by the lever when the slide moves to a certain position and means operated by the lever for throwing in the clutch, whereby the screw will be rotated to move the brush holder along the slide.

14. In a bristling machine, the combination with a shaft rotating constantly, a clutch section thereon, a screw in alignment therewith and having a clutch section on its end, a slide on which said screw is journalled, means for moving the slide, a series of brush back holders each having a threaded portion on its under side to fit said screw, a bell crank carried by said slide, a stationary stop and a pin in position to be engaged by the bell crank when the slide moves to bring the bell crank into engagement with said stop, means operated by the pin for throwing in the clutch, and means whereby the clutch will be thrown out and the screw will be stopped positively.

15. In a brush bristling machine, the combination with a reciprocable slide, of a brush back holder slidably mounted thereon and movable therewith, said brush holder having a screw thread on the inner side, a screw on the slide for moving the brush holder along the slide, a constantly rotating shaft in alignment with the screw, said screw and shaft having co-acting clutch sections thereon, a projection on one of the clutch sections, a pivoted arm normally engaging said projection to prevent the throwing in of the clutch, a disc on the screw having a recess, a second pivoted arm having a projection for entering said recess and positively holding the screw from rotating, and a pin on the first arm for engaging the second and throwing the projection out of the notch in the disc when the first arm is turned to release the clutch.

16. In a machine for bristling brushes, the combination with a main shaft and an index cam thereon, of a second shaft adapted to be operated by the main shaft, a pattern cam on the second shaft, a second cam on the second shaft, a carriage, means operated by the second cam for moving said carriage laterally, a slide on the carriage, means operated by the pattern cam for moving the slide on the carriage longitudinally, the two cams having the same number of stations arranged in a definite relation to each other to provide the necessary motions of the slide to shift the slide as desired, and a holder carried by the slide for brushes.

17. In a machine for bristling brushes, the combination with a main shaft and an index cam thereon, of a slide operated by the cam, a second shaft, an arm oscillatingly mounted on the second shaft and having a ratchet pawl, an index wheel on the second shaft adapted to be operated by the ratchet pawl, a pattern cam on the second shaft, a second cam on the second shaft, a carriage, means operated by the second cam for moving said carriage laterally, a slide on the carriage, means operated by the pattern cam for moving the slide on the carriage longitudinally, the two cams having the same number of stations arranged in a definite relation to each other to provide the necessary motions of the slide to shift the slide as desired, a holder carried by the slide for brushes, a third cam on said second shaft, a third shaft, a clutch for connecting the third shaft with the main shaft, means operated by the third cam for releasing the clutch and disconnecting the third shaft and means connected with said third shaft for applying the tufts of bristles to the brush blanks on said holder.

18. In a machine for bristling brushes, the combination with a main shaft and an index cam thereon, of a second shaft adapted to be operated by the main shaft, a pattern cam on the second shaft, a second cam on the second shaft, a carriage, means operated by the second cam for moving said carriage laterally, a slide on the carriage, means operated by the pattern cam for moving the slide on the carriage longitudinally, the two cams having the same number of stations arranged in a definite relation to each other to provide the necessary motions of the slide to shift the slide as desired, a holder carried by the slide for brushes, a third cam on said second shaft, a third shaft, a clutch for connecting the third shaft with the main shaft, means operated by the third cam for releasing the clutch and disconnecting the third shaft and means connected with said third shaft for applying tufts of bristles to the brush blanks.

19. In a machine for bristling brushes, the combination with a main shaft and an index cam thereon, of a second shaft adapted to be operated by the main shaft, a pattern cam on the second shaft, a second cam on the second shaft, a carriage, means operated by the second cam for moving said carriage laterally, a slide on the carriage, means operated by the pattern cam for moving the slide on the carriage longitudinally, the two cams having the same number of stations arranged in a definite relation to each other to provide the necessary motions of the slide to shift the slide as desired, a holder carried by the slide for brushes, a third cam on said second shaft, a third shaft, a clutch for connecting the third shaft with the main shaft, means operated by the third cam for releasing the clutch and disconnecting the third shaft and means connected with said third shaft for raising and lowering a drill.

20. In a brush bristling machine, the combination with a main shaft and an index feed cam fixed thereon, of a second shaft, an index wheel on the second shaft having notches, a lever free on the second shaft, a pawl on the lever for engaging in said notches and advancing the index wheel and its shaft one step at each oscillation of said lever, means connected with the index feed cam for oscillating said lever, a pattern cam on said second shaft, a second cam on the second shaft, a carriage, a slide movably mounted on the carriage, means for supporting the brush blanks on the slide, and means connected with the two cams on said shaft whereby one of them shifts the carriage in one direction and the other shifts the slide in a direction at right angles thereto.

21. In a brush bristling machine, the combination with a main shaft and an index cam thereon, of a clutch for connecting the main shaft with a source of power, means whereby, when the clutch is moved to disconnect the main shaft, a brake will be applied to said cam to stop said shaft, a second shaft having two cams thereon, means operated by the index cam for rotating the second shaft by a step by step motion, one step for each rotation of the main shaft, and means operated by the two cams on the second shaft for shifting brush blanks laterally and longitudinally.

22. In a brush bristling machine, the combination with a carriage extending longitudinally and movable laterally, a slide longitudinally movable on the carriage, brush holders on the slide movable therewith and movable in a longitudinal direction independently thereof, a cam for moving the carriage laterally and intermittently, a pattern cam rotatable therewith, a lever adapted to be oscillated by the pattern cam and a bearing surface for the other end of the lever located on the slide and parallel to the direction of motion of the carriage, whereby the lever can operate the slide irrespective of the position of the carriage.

23. In a brush bristling machine, the combination with a main shaft and an index feed cam fixed thereon, of a second shaft, an index wheel on the second shaft having notches, a lever on the second shaft, a pawl on the lever for engaging in said notches and advancing the index wheel and its shaft one step at each oscillation of said lever, means connected with the index feed cam for oscillating said lever, and a brush back holder operated by said main shaft.

24. In a brush bristling machine, the combination with a driving shaft, a drill and means constantly operated by the driving shaft for rotating the drill, of a main shaft, a clutch for connecting the main shaft with the driving shaft, an index device operated by the main shaft, an operating shaft, means connected with the indexing device for throwing the operating shaft out of operation periodically during the rotation of the indexing means, a cam on the operating shaft and means operated by said cam for raising and lowering the drill periodically when the operating shaft is in operation.

25. In a brush bristling machine, the combination of an indexing device for moving the brush blanks in a certain path, with a picker mechanism comprising a picker having a rearwardly inclined notch for engaging the tufts of bristles and a picker bar having a downwardly extending notch for receiving the bristles and adapted to deliver them to the inclined notch when the picker moves forward with respect to the picker bar.

26. In a device for removing a bunch of bristles from a hopper, the combination of a picker bar having a downwardly extending notch in the upper edge for receiving the bristles in the hopper, a picker having a backwardly inclined notch in the upper edge extending down below the notch in the picker bar, positive means for moving the picker back and forth, a lost motion connection between the picker and picker bar whereby said means will move the picker bar with the picker at each end of the reciprocation thereof, and means for latching the picker bar in its forward and rearmost positions, said moving means having means whereby the picker bar is unlatched at each end of the free stroke of the picker.

27. In a tuft forming device for a bristling machine, the combination with a picker bar and a picker, said picker bar having a notch extending inwardly from its edge and a picker having a slanting notch extending in farther and means for moving the picker and picker bar relatively to each other, whereby the slanting notch in the picker will pass by the side of the notch in the picker bar and gather the bristles in that notch into the bottom of the inclined notch and hold them there while said picker and picker bar move out of receiving position.

28. In a device for removing a bunch of bristles from a hopper, the combination of a picker bar having a downwardly extending notch in the upper edge for receiving the bristles in the hopper, said picker bar being of inverted U-shape open at the bottom, a picker therein having a backwardly inclined notch in the upper edge extending down farther than the notch in the picker bar, and means for moving the picker back and forth.

29. In a device for removing a bunch of bristles from a hopper, the combination of a picker bar having a downwardly extending notch in the upper edge for receiving the bristles in the hopper, a picker therein having a backwardly inclined notch in the upper edge extending down farther than the notch in the picker bar, means for moving the picker bar back and forth, and a lost motion connection between the picker and picker bar whereby said means will move the picker bar with the picker at each end of the reciprocation thereof.

30. In a brush bristling machine, the combination of an indexing device for moving the brush blanks in a certain path, with a hopper for bristles, means for receiving a bunch of bristles in said hopper, mechanism for separating the bristles from those in the hopper and carrying them forward therefrom comprising a picker having a slanting notch for engaging the tufts of bristles and a picker bar in which said picker is located having a vertical notch for receiving the bristles and adapted to deliver them to the inclined notch when the picker moves forward in the picker bar, and means for setting the tuft in another set of previously drilled blanks.

31. In a tuft forming device for a bristling machine, the combination with a picker bar having a notch in its edge adapted to receive bristles from a hopper full of bristles, of a picker relatively reciprocable and having a forwardly inclined surface adapted to receive bristles in said notch terminating in a reversely inclined notch having a projection beyond it for holding a bunch of bristles in the two notches when the picker has moved into a position for the innermost portions of said notches to register.

32. In a tuft forming device for a bristling machine, the combination with a bristle hopper and a picker bar having a slot in its upper edge adapted to receive bristles from a hopper full of bristles above it, of a picker bar relatively reciprocable and having a forwardly inclined surface adapted to receive bristles in said notch terminating in a reversely inclined notch having a projection above it for holding a bunch of bristles in the two notches when the picker has moved into a position for the lowermost portions of said notches to register, means for holding the picker bar in a position in which its notch is under the bottom of the bristle hopper, means for moving the picker forward into a position in which the lower ends of the notches coincide, means for unlatching the picker bar, and means for then moving the picker and picker bar forward together to bring the bristles out beyond the hopper in a position for further operation.

33. In a tuft forming device for a bristling machine, the combination with a bristle hopper, and a picker bar having a notch in its upper edge adapted to receive bristles from a hopper full of bristles above it, of a picker relatively reciprocable and having a reversely inclined notch for holding a bunch of bristles in the two notches when the picker has moved into a position for the lowermost portions of said notches to register, means for moving the picker into a position in which the lower ends of the notches coincide, and means for moving the picker and picker bar forward together to bring the bristles out beyond the hopper in a position for further operation.

34. In a bristling machine, the combination with a hopper for bristles, of a picker bar having a notch in its upper edge movable along the bottom of said hopper for receiving bristles therefrom, a picker movable with and also independently of the picker bar and having a rearwardly slanting notch in its upper edge for engaging the bristles in the first named notch and holding them in the bottom of the second notch, and means for moving the picker and picker bar together out from under the hopper.

35. In a bristling machine, the combination with a hopper for bristles, of a picker bar having a notch in its upper edge movable along the bottom of said hopper for receiving bristles therefrom, a picker movable with and also independently of the picker bar and having a rearwardly slanting notch in its upper edge for engaging the bristles in the first named notch and holding them in the bottom of the second notch, means for moving the picker and picker bar together out from under the hopper, a tapering hollow nozzle, means for moving the nozzle under the center of the bunch of bristles held by the picker and picker bar and means for engaging the bristles in the center of their length and forcing them down through the nozzle and bending them up double to form a tuft.

36. In a brush bristling machine, the combination with means for holding a brush blank and means for taking a bunch of bristles from the bottom of a bristle hopper and moving them out beyond the edge thereof, said means having a notch for receiving said bristles and means for holding them in the notch, of a needle, means for moving the needle down against the center of the bunch of bristles and means for moving the brush blank with the previously drilled hole under the bristles and in line therewith so that the needle will force the tuft into the drilled hole in the brush blank.

37. In a bristling machine, the combination with two slides, a rod carried by one slide, a hollow nozzle carried by the rod, a needle carried by the other slide in vertical alignment with the nozzle, a vertical slidable rod operated by one slide, a spring for lowering the rod, an anchor spring on the second rod in position to engage an anchor and hold it against a flat surface, means whereby the needle will eventually engage the anchor and force it through the nozzle, means for holding a previously drilled brush blank in position for one of the drilled holes therein to be in alignment with the nozzle and needle, a device for engaging the previously set bristles to force them out of the way of the new set and means for operating said device just before the tuft of bristles descends into the brush back.

38. In a bristling machine, the combination with a rod, a hollow nozzle, a needle in vertical alignment with the nozzle, an anchor spring in position to engage an anchor and hold it against a flat surface, means whereby the needle will eventually engage the anchor and force it through the nozzle, means for holding a previously drilled brush blank in position for one of the drilled holes therein to be in alignment with the nozzle and needle, a device for engaging the previously set bristles to force them out of the way of the new set and means for operating said device just before the tuft of bristles descends into the brush back.

39. In a bristling machine, the combination of a hollow nozzle, a needle in vertical alignment with the nozzle, means whereby the needle will engage a bunch of bristles and force it through the nozzle, a device for engaging the previously set bristles to force them out of the way of the new set and means for operating said device just before the tuft of bristles descends into the brush back.

40. In a bristling machine, the comination of a nozzle, means for locating the nozzle at the center of the bunch of bristles, means for locating a brush blank with one of its drilled holes in alignment with the center of said nozzle, means for feeding an anchor, a needle reciprocable against the anchor for moving the anchor against the center of the bunch of bristles and forcing the same into the nozzle and into the brush blank, an anchor spring adapted to engage the anchor and means for moving the anchor spring with the needle.

41. In a bristling machine, the combination with means for removing a bunch of bristles in a horizontal position from the bottom of a bristle hopper and holding them in horizontal position, of a nozzle, means for locating the nozzle directly under the center of said bunch of bristles, means for locating a brush blank with one of its drilled holes in alignment with the center of said nozzle, means for cutting out a metal anchor, and a needle reciprocable against the anchor for moving the anchor against the center of the bunch of bristles and forcing the same down into the nozzle and into the brush blank.

42. In a bristling machine, the combination with means for removing a bunch of bristles in a horizontal position from the bottom of a bristle hopper and holding them in a horizontal position, of a nozzle, means for locating the nozzle directly under the center of said bunch of bristles, means for locating a brush blank with one of its drilled holes in alignment with the center of said nozzle, means for cutting out a metal anchor, a needle reciprocable against the anchor for moving the anchor against the center of the bunch of bristles and forcing the same down into the nozzle and into the brush blank, an anchor spring adapted to engage the anchor where it is left by the anchor froming means and means for moving the anchor spring with the needle to keep control of the anchor until the anchor engages the bristles.

43. In a bristling machine, the combination with means for removing a bunch of bristles from a bristle hopper, of a nozzle, means for locating the nozzle under the center of said bunch of bristles, means for locating a brush blank with one of its drilled holes in alignment with the center of said nozzle, means for cutting out a metal anchor, a needle reciprocable against the anchor for moving the anchor against the center of the bunch of bristles and forcing the same into the nozzle and into the brush blank, an anchor spring adapted to engage the anchor where it is left by the anchor forming means and means for moving the anchor spring with the needle.

44. In a bristling machine, the combination with two slides and two cams for operating them, one of said slides having a head yieldingly connected with it on both sides, a rod carried by the head, a hollow nozzle carried by the rod, a needle carried by the other slide in vertical alignment with the nozzle, a pin carried by the second slide, a vertical slidable rod having means by which the pin will engage it and raise it, a spring for lowering the second rod, an anchor spring on the second rod in position to move just ahead of the needle and engage an anchor and hold it against a flat surface, whereby the needle will eventually engage the anchor and force it through the nozzle.

45. In a brush bristling machine, the combination with means for collecting a bunch of bristles and holding them over previously drilled brush backs, of means for supporting a coil of flat strip metal, means for cutting through the edge of said metal periodically and producing an anchor of trapezoid shape and holding it in position over a drilled hole in the brush back, means for pushing the anchor and bunch of bristles into a hole in the brush blank, and means for pulling the strip of metal laterally to feed the waste out of the machine and bring a new area of it in position to be formed into a new anchor.

46. In a brush bristling machine, the combination with means for holding a bunch of bristles over previously drilled brush backs, of means for supporting a coil of metal, means for cutting through said metal periodically and producing an anchor and holding it in position over a drilled hole in the brush back and means for pushing the anchor and bunch of bristles into a hole in the brush blank.

47. In a brush bristling machine, the combination with means for drilling the brush blanks, and means for applying tufts of bristles thereto, of means for inserting a metal anchor in each tuft of bristles to hold the same in the brush and placing said anchor at an angle to a line connecting two adjacent drilled holes for the purpose described.

48. In a brush bristling machine, the combination with means for locating a brush blank with a previously drilled hole in a definite position, a nozzle located in line with the said hole and means for moving a straight bunch of bristles into a position at the mouth of the nozzle, of means for moving a flat strip of wire laterally, a die for cutting an anchor from said wire and moving it into a position to register with the center of a bunch of bristles and a needle movable against said anchor to force the anchor against the bristles and the bristles through the nozzle into the brush blank in the form of a tuft, said anchor forming means being located at an acute angle to the length of the brush blanks, whereby said anchors will be set in the brush blanks so as not to tend to form a longitudinal crack therein.

49. In a brush bristling machine, the combination with means for locating a brush blank with a previously drilled hole in a definite position, of means for cutting an anchor and moving it into a position to register with the center of a bunch of bristles and a needle movable against said anchor to force the anchor against the bristles and the bristles into the brush blank in the form of a tuft, said anchor forming means being located at an acute angle to the length of the brush blanks, whereby said anchors will be set in the brush blanks so as not to tend to form a longitudinal crack therein.

50. In a bristling machine, the combination with means for supporting a bunch of bristles in horizontal position, of a die above said position, a plunger in the die, means for moving the plunger through the die and to the edge thereof, said die having a lateral opening therethrough for a strip of flat wire wider than the plunger, whereby the plunger will cut out only a part of the strip and leave the rest intact, a rod pivoted on an axis perpendicular to the axis of the plunger and having a gripping device, means for causing the gripping device to grip the flat wire where it passes out of the die and means for swinging the rod away from the die to pull the wire through to a new position.

51. In a brush bristling machine, the combination with a swinging perforated arm, a pin movable in its perforation and having a stop fixed thereon, a reciprocable rod on which the pin is pivoted, a frame pivoted on an axis parallel to the last named pivot, a rod on the frame, spring-pressed against the end of the first named rod, said rod having a grip on the end, means for swinging said frame laterally so that said grip will engage a wire or the like and then will swing to feed it and a die having a plunger connected with said head for cutting anchors out of said wire and having a passage therein through which the wire passes.

52. In a brush bristling machine, the combination with a shaft having an eccentric pin thereon, a disc freely mounted on said eccentric pin, a reciprocable head with which the disc is adjustably connected preventing the rotation of the disc on its own axis, said rod having a spring-pressed grip on the end, means for swinging said frame laterally so that said grip will engage a wire or the like and then will swing to feed it and a die having a plunger connected with said head for cutting anchors out of said wire and having a passage therethrough for the wire.

53. In a brush tufting machine, the combination of a shaft, a parallel shaft operated thereby, means operated by the parallel shaft for presenting a tuft of bristles in position for further operation, a shaft operated by the last named shaft and having an eccentric pin, a die for receiving a wire, a plunger operated directly by said eccentric pin for cutting off a part of the wire and forming an anchor and presenting it in position over the bunch of bristles and means also operated by said eccentric pin for feeding the wire laterally through the die.

54. In a device of the character described, the combination with a hopper having three sides and open on the fourth side, of a chain extending along the fourth side, said chain having members pivoted thereto and provided with projections adapted to extend inwardly and transversely across the hopper to engage the bristles therein and force them positively forward in the hopper as the chain moves along and means back of the chain for holding said members in a position transverse to the direction of motion of the chain.

55. In a device of the character described, the combination in a hopper for bristles, of an endless chain extending downwardly along one side thereof and constituting one side of the hopper, means constantly tending to force the chain down that side of the hopper, said chain having pivoted members having projections, means for holding said projections horizontally across the hopper while moving down for the purpose of feeding the bristles down in the hopper, said pivoted members having projections at the rear, and a stationary cam for controlling their motions and allowing them to swing outwardly as the chain passes to the bottom of its path of travel.

In testimony whereof I have hereunto affixed my signature.

EARL R. PERSON.